(12) United States Patent
Ulbricht et al.

(10) Patent No.: US 11,048,977 B1
(45) Date of Patent: Jun. 29, 2021

(54) METHOD AND DEVICE FOR PIXEL-LEVEL OBJECT SEGMENTATION

(71) Applicant: Apple Inc., Cupertino, CA (US)

(72) Inventors: Daniel Ulbricht, Sunnyvale, CA (US); Mohammed Haris Baig, San Jose, CA (US); Amit Kumar K C, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 99 days.

(21) Appl. No.: 16/580,294

(22) Filed: Sep. 24, 2019

Related U.S. Application Data

(60) Provisional application No. 62/737,602, filed on Sep. 27, 2018.

(51) Int. Cl.
*G06K 9/62* (2006.01)
*G06T 7/10* (2017.01)

(52) U.S. Cl.
CPC .......... *G06K 9/6259* (2013.01); *G06K 9/6232* (2013.01); *G06T 7/10* (2017.01); *G06T 2207/20081* (2013.01)

(58) Field of Classification Search
CPC ...... G06K 9/6259; G06K 9/6232; G06T 7/10; G06T 2207/20081
See application file for complete search history.

(56) References Cited

U.S. PATENT DOCUMENTS

| 10,134,131 | B1 * | 11/2018 | Ando | G06N 3/0454 |
| 10,467,754 | B1 * | 11/2019 | Ando | G06K 9/6215 |
| 2011/0040711 | A1 * | 2/2011 | Perronnin | G06N 20/10 706/12 |
| 2012/0082371 | A1 * | 4/2012 | Bengio | G06K 9/6282 382/159 |
| 2012/0106821 | A1 * | 5/2012 | Madabhushi | G06T 7/0012 382/133 |
| 2016/0132750 | A1 * | 5/2016 | Yang | G06F 16/56 382/197 |
| 2016/0171695 | A1 * | 6/2016 | Jacobs | G06T 11/005 382/131 |
| 2018/0089834 | A1 * | 3/2018 | Spizhevoy | G06T 7/0002 |

(Continued)

OTHER PUBLICATIONS

Kaiming HE et al., "Mask R-CNN", Facebook AI Research (FAIR); arXiv:1703.06870v3 [cs.CV]; Jan. 24, 2018; pp. 1-12.

*Primary Examiner* — Ian L Lemieux
(74) *Attorney, Agent, or Firm* — Fernando & Partners, LLP

(57) ABSTRACT

In one implementation, a method of training a type-agnostic object segmentation system is performed in a type-agnostic object segmentation system including one or more processors, and a non-transitory memory. The method includes obtaining a data set; generating a respective embedding vector for each of a plurality of pixels of the image frame; mapping a plurality of embedding vector representations into a dataspace defined by a dimensionality of the plurality of embedding vector representations; comparing the at least one object instance representation candidate against the respective segmentation mask; and adjusting the type-agnostic object segmentation system in order to satisfy an error threshold across the plurality of image data frames according to a determination that the at least one object instance representation candidate and the respective segmentation mask differ by a threshold value.

21 Claims, 16 Drawing Sheets

(56) References Cited

U.S. PATENT DOCUMENTS

| | | | |
|---|---|---|---|
| 2019/0279074 A1* | 9/2019 | Lin | G06F 16/5854 |
| 2019/0347792 A1* | 11/2019 | Pauly | A61B 5/7267 |
| 2020/0026960 A1* | 1/2020 | Park | G06K 9/6218 |
| 2020/0272888 A1* | 8/2020 | Wang | G06N 3/0454 |
| 2020/0364554 A1* | 11/2020 | Wang | G06N 3/0454 |

* cited by examiner

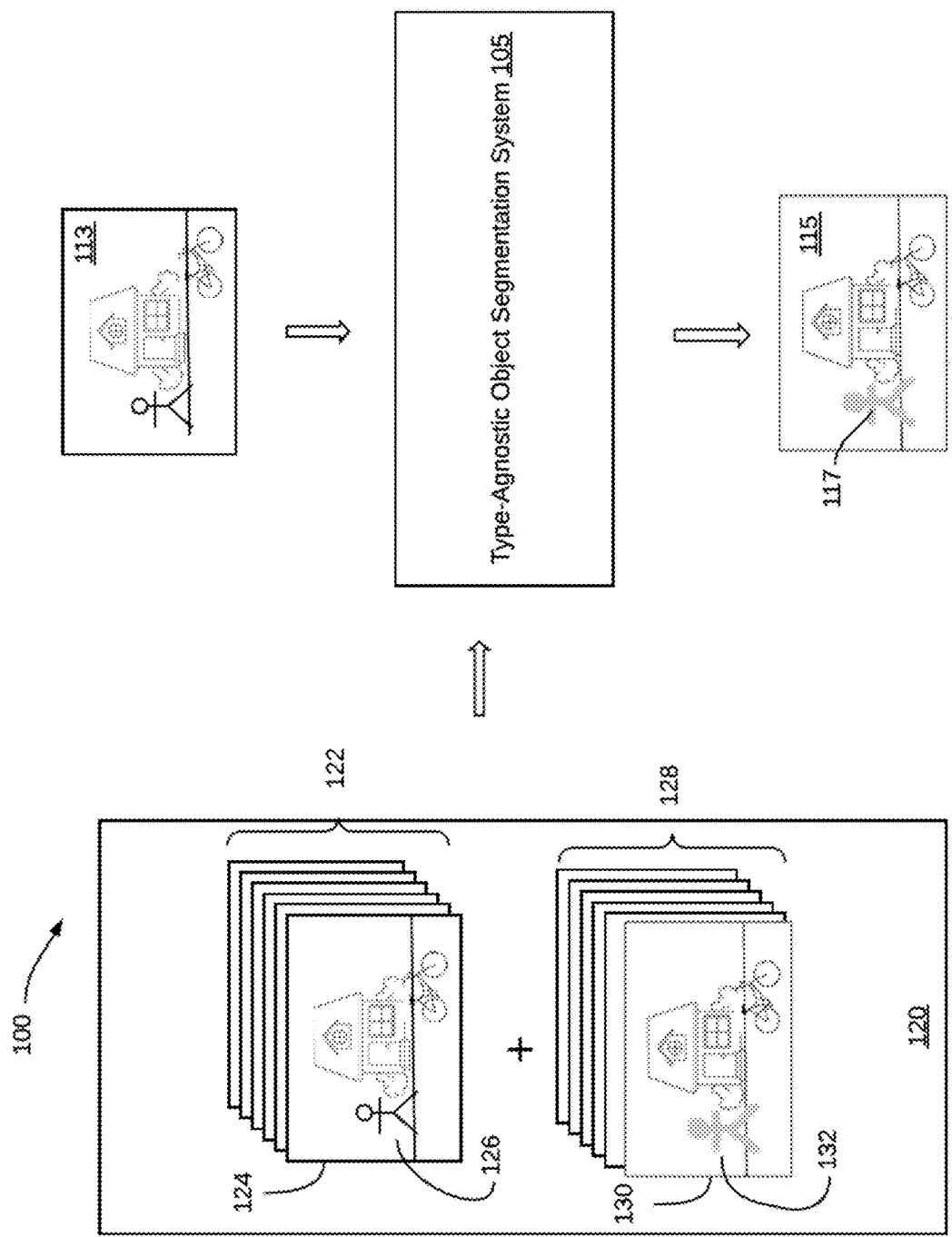

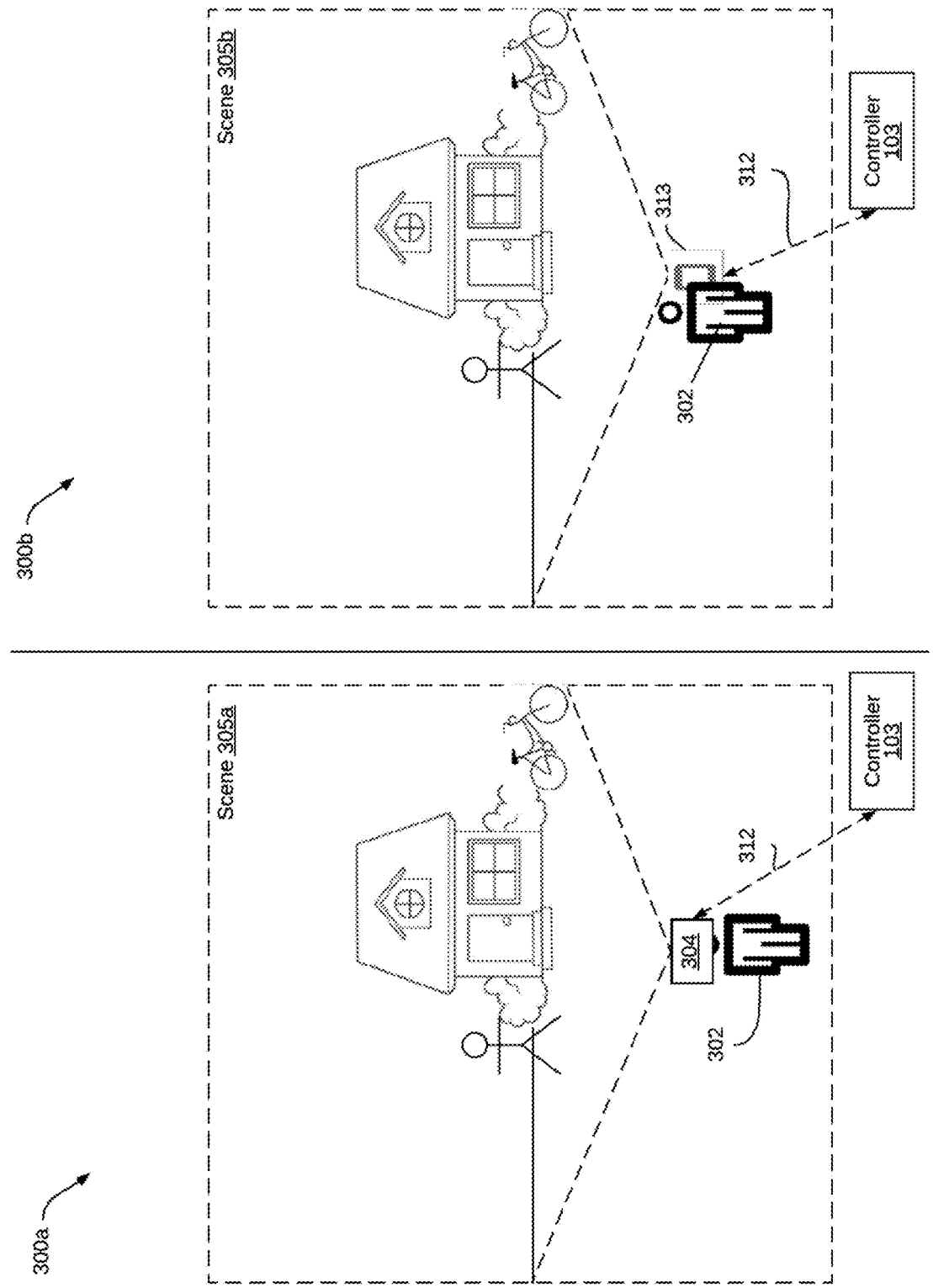

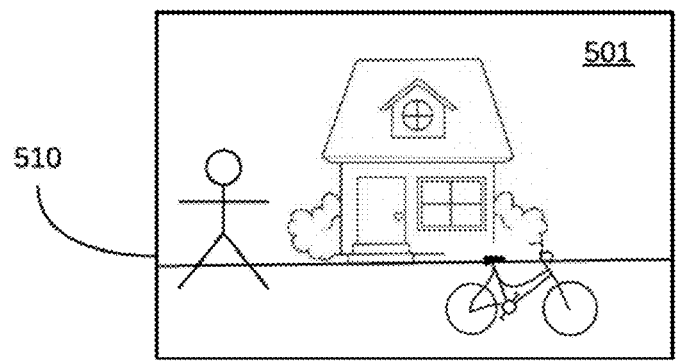
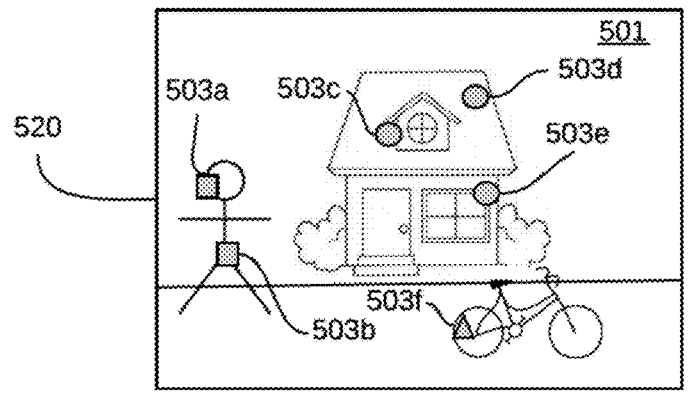
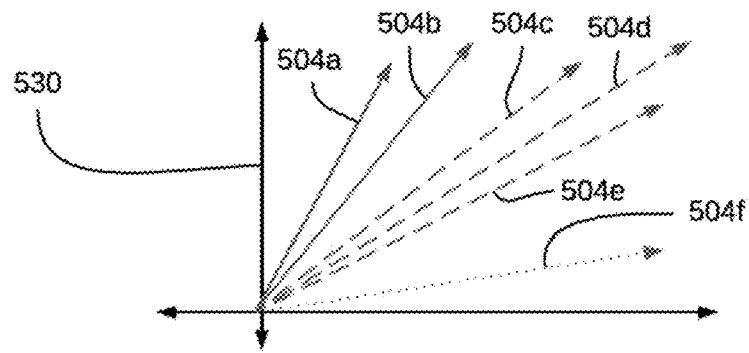
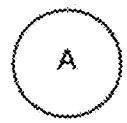
FIGURE 5A

US 11,048,977 B1

METHOD AND DEVICE FOR PIXEL-LEVEL OBJECT SEGMENTATION

CROSS REFERENCE TO RELATED APPLICATIONS

This application claims the benefit of U.S. Provisional Patent Application No. 62/737,602, filed Sep. 27, 2018, which is incorporated by reference herein in its entirety.

TECHNICAL FIELD

The present disclosure generally relates to a type-agnostic object segmentation system, and in particular, to systems, methods, and devices for detecting object instance representations of objects.

BACKGROUND

Previous object identification systems are limited to recognizing particular objects that the previous object identification systems have been specifically trained to recognize. As such, during runtime, these previous object identification systems are limited to identifying the particular objects supposed during training.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1 is a block diagram of a process environment in accordance with some implementations.

FIGS. 3A-3B are block diagrams of example operating environments in accordance with some implementations.

FIGS. 5A-5B illustrate a process for detecting the presence of object instance representations in accordance with some implementations.

Figure 2A:
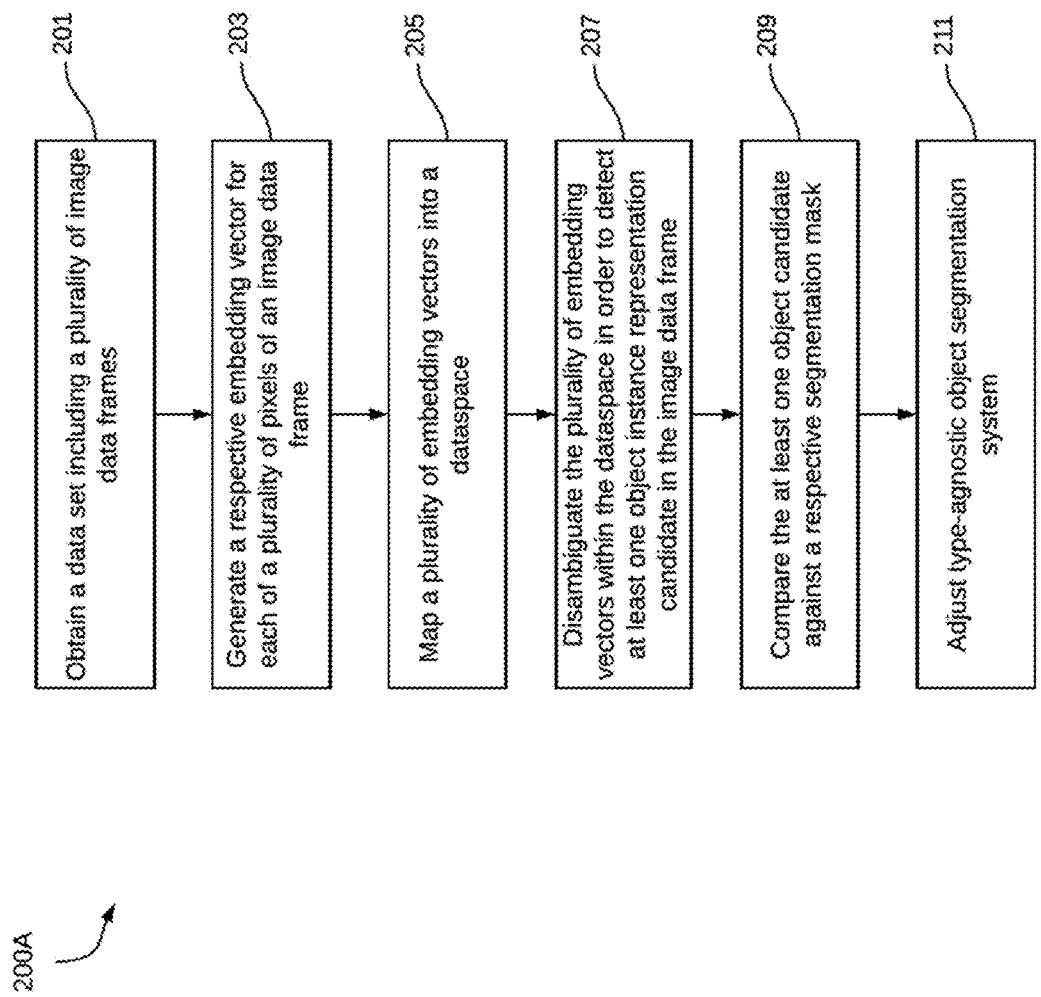
FIG. 2A is a flowchart representation of a method of training a type-agnostic object segmentation system in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for training a type-agnostic object segmentation system. According to some implementations, the method is performed in a type-agnostic object segmentation system (e.g., during training) including one or more processors and a non-transitory memory. The method includes: obtaining a data set, wherein the data set includes a plurality of image data frames, wherein each of the plurality of image data frames is associated with a respective segmentation mask, the respective segmentation mask demarking at least one object instance representation within a corresponding one of the plurality of image data frames; generating a respective embedding vector for each of a plurality of pixels of the image data frames, wherein the plurality of pixels of the image data frames includes at least a portion of an image data frame; mapping a plurality of embedding vector representations into a dataspace, wherein the dataspace is defined by a dimensionality of the plurality of embedding vector representations; disambiguating the plurality of embedding vector representations within the dataspace in order to detect at least one object instance representation candidate in an image; comparing the at least one object instance representation candidate against the respective segmentation mask; and adjusting the type-agnostic object segmentation system in order to satisfy an error threshold across the plurality of image data frames according to a determination that the at least one object instance representation candidate and the respective segmentation mask differ by a threshold value.

Various implementations disclosed herein include devices, systems, and methods for detecting the presence of object instance representations within an image data frame. In various methods, the method is performed in a type-agnostic object segmentation system (e.g., at runtime) including one or more processors and a non-transitory memory. The method includes obtaining an image data frame; generating a respective embedding vector for each of a plurality of pixels of the image data frame, wherein the plurality of pixels of the image data frame includes at least a portion of the image data frame; mapping a plurality of embedding vector representations into a dataspace, wherein the dataspace is defined by a dimensionality of the plurality of embedding vector representations; and detecting at least one object instance representation candidate in the image data frame by disambiguating the plurality of embedding vector representations within the dataspace.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes:

one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Previous object identification systems are limited to recognizing particular objects that the previous object identification systems have been specifically trained to recognize. As such, during runtime, these previous object identification systems are limited to identifying the particular objects supplied during training. By contrast, in various implementations, a type-agnostic object segmentation system is trained to recognize the presence of object instance representations within an image data frame by generating embedding vectors on a pixel-by-pixel basis. The embedding vectors enable identification of both object instance representations of objects included in training data and other objects that were not included in the training data.

FIG. 1 is a block diagram of a process environment 100 in accordance with some implementations. In various implementations, a type-agnostic object segmentation system 105 or portions thereof are included in a device or system such as a controller (e.g., the controller 103 shown in FIGS. 3A-3B, and FIG. 9), a server, a computer, a laptop computer, a tablet device, a mobile phone, a smartphone, and a wearable computing device (e.g., a head-mounted display (HMD)). While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the process environment 100 includes at least a set of x-labeled training objects 120 and the type-agnostic object segmentation system 105.

In some implementations, the set of x-labeled training objects 120 is provided to train and validate the type-agnostic object segmentation system 105. The set of x-labeled training objects 120 corresponds to a training corpus (e.g., the training corpus 940a in FIG. 9) that includes a smaller subset of object instance representations than the type-agnostic object segmentation system 105 is ultimately capable of recognizing. The set of x-labeled training objects 120 comprises a plurality of image data frames 122 and a plurality of segmentation masks 128. The plurality of image data frames 122 includes a first image data frame 124 (e.g., a first image data frame among the plurality of image data frames 122) that includes at least one object instance representation 126. The plurality of segmentation masks 128 includes a respective segmentation mask 130 (e.g., a first segmentation mask among the plurality of segmentation masks 128) for the first image data frame 124 that includes at least one object mask 132 that demarks at least one object instance representation (e.g., the at least one object instance representation 126).

In some implementations, the type-agnostic object segmentation system 105 recognizes the presence of object instance representations within an image data frame such as an unlabeled image data frame 113. The unlabeled image data frame 113 is similar to the first image data frame 124 except that the at least one object instance representation 126 is not labeled. In some implementations, the unlabeled image data frame 113 is provided to verify that the type-agnostic object segmentation system 105 is trained properly.

In some implementations, the type-agnostic object segmentation system 105 obtains the unlabeled image data frame 113 from a database or a training corpus (e.g., the training corpus 940a shown in FIG. 9) and performs instance segmentation on the unlabeled image data frame 113. The process of detecting at least one object instance representation candidate 117 within a labeled image data frame 115 based on an unlabeled image data frame 113 will be described in further detail below in method 400 in FIG. 4 and process 500 in FIGS. 5A-5B. The object instance representation candidate 117 is similar to the at least one object mask 132 except that the at least one object mask 132 is known a priori whereas the at least one object instance representation candidate 117 is detected after the type-agnostic object segmentation system performs instance segmentation on the unlabeled image data frame 113.

In some implementations, the type-agnostic object segmentation system 105 is trained by adjusting filter weights, or the like in order to satisfy an error threshold across the plurality of image data frames if the unlabeled image data frame 113 does not result in an expected output. In some implementations, the type-agnostic object segmentation system 105 is trained by adjusting a cluster variance associated with disambiguating the embedding vector representations if the unlabeled image data frame 113 does not result in the expected output.

Adjustments are made to the type-agnostic object segmentation system 105 in order to satisfy an error threshold across the plurality of image data frames 122 according to a determination that the at least one object instance representation candidate 117 and the respective segmentation mask 132 differ by a threshold value. In other words, the type-agnostic object segmentation system 105 is trained until the error threshold is met across the plurality of image data frames 122. The process of adjusting the type-agnostic object segmentation system 105 is described in greater detail below with reference to method 200B in FIG. 2B.

In some implementations, when the type-agnostic object segmentation system 105 has been properly trained, the type-agnostic object segmentation system 105 is ready to detect the presence of unknown object instances within the unlabeled image data frame 113. Runtime usage of the type-agnostic object segmentation system 105 (e.g., after training has been completed) is described below with reference to method 400 in FIG. 4.

FIG. 2A is a flowchart representation of a method 200A of training a type-agnostic object segmentation system in accordance with some implementations. In various implementations, the method 200A is performed by a device (e.g., a controller 103 shown in FIGS. 3A-3B and FIG. 9, a CGR device 304 shown in FIG. 3A, or a user device 313 shown in FIG. 3A) with one or more processors and non-transitory memory that trains the type-agnostic object segmentation system (e.g., the type-agnostic object segmentation system 105 in FIG. 1). In some implementations, the method 200A is performed by processing logic, including hardware, firmware, software, or a combination thereof. In some implementations, the method 200A is performed by a processor executing code stored in a non-transitory computer-readable medium (e.g., a memory).

As represented by block 201, the method 200A includes obtaining a data set including a plurality of image data frames. For example, as shown in FIG. 1, the plurality of image data frames (e.g., the plurality of image data frames 122 shown in FIG. 1) corresponds to respective segmentations masks (e.g., the plurality of segmentation masks 128 shown in FIG. 1) and each of the plurality of image data frames (e.g., a first image data frame 124 from among the plurality of image data frames 122 shown in FIG. 1) are associated with a respective segmentation mask (e.g., the at least one object mask 132 among the plurality of segmentation masks 128 shown in FIG. 1). In some implementations, the respective segmentation masks indicate a shape-estimation of an unknown object that can be rigid or non-rigid. In some implementations, a controller 103 obtains the data set (e.g., the set of x-labeled training objects 120 shown in FIG. 1) from a training corpus (e.g., the training corpus 940a shown in FIG. 9) or a database. The respective segmentation masks for the respective image data frame demark at least one object instance representation (e.g., the at least one object instance representation 126 shown in FIG. 1).

As represented by block 203, the method 200A includes generating a respective embedding vector (e.g., the embedding vectors 504a-f shown in FIG. 5A) for each of a plurality of pixels of the image data frame. In some implementations, the embedding vectors 107 are n-dimensional vectors having one or more axes that correspond to different features of a singular pixel. In some implementations, a type-agnostic object segmentation system 105 generates a respective embedding vector for each of the pixels of an image data frame. In some implementations, the type-agnostic object segmentation system 105 generates a respective embedding vector for some of the pixels of an image data frame. In some implementations, the image data frame includes information for each pixel and each pixel is associated with an embedding vector.

As represented by block 205, the method 200A includes mapping a plurality of embedding vector representations into a dataspace. In some implementations, the type-agnostic object segmentation system 105 defines a dataspace (e.g., the embedding vector representations mapped in a dataspace 508 shown in FIG. 5B). Any set of dimensions may be represented in the dataspace. As such, any feature or characteristic that may be indicative or informative of one or more features associated with one or more pixels from the plurality of pixels may be used as a dimension in the dataspace.

As represented by block 207, the method 200A includes disambiguating the plurality of embedding vector representations within the dataspace in order to detect at least one object instance representation candidate in the image data frame. An object instance representation candidate 117 is a particular representation of an object in the image data. As a non-limiting example, the object instance representation candidate 117 corresponds to a representation of a real-life object such as a building, a bicycle, a house, a person, or the like. As another example, in FIGS. 6A-6C, the object instance representation candidates correspond to a first object (e.g., a first person 602 that is jumping shown in FIGS. 6A-6C) and a second object (e.g., a second person 604 that is in a fighting stance shown in FIGS. 6A-6C). In some implementations, an instance level segmentation method enables tracking objects-of-interest, which will be described in further detail in FIG. 8.

As represented by block 209, the method 200A includes comparing the at least one object instance representation candidate against a respective segmentation mask. For example, in FIG. 1, the type-agnostic object segmentation system 105 compares a detection of the object instance representation candidate 117 from the labeled image data frame 115.

As represented by block 211, the method 200A includes adjusting the type-agnostic object segmentation system 105 in order to satisfy an error threshold across the plurality of image data frames 122 according to a determination that the at least one object instance representation candidate and the respective segmentation mask differ by a threshold value. The process of adjusting the type-agnostic object segmentation system 105 will be described in greater detail below in FIG. 2B.

Figure 2B:
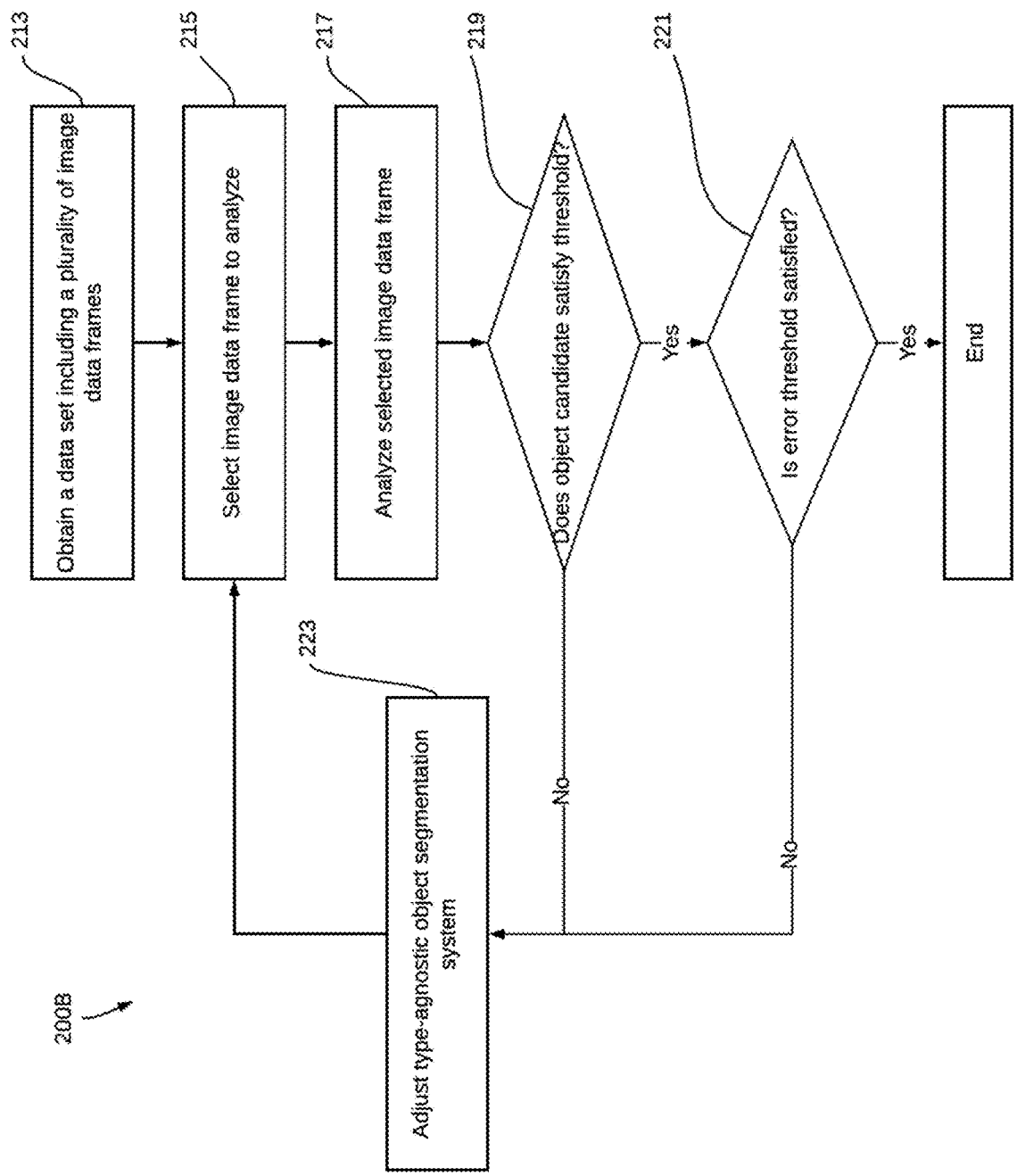
FIG. 2B is a flowchart representation of a method of adjusting a type-agnostic object segmentation system in accordance with some implementations.

FIG. 2B is a flowchart representation of a method 200B of adjusting a type-agnostic object segmentation in accordance with some implementations. In various implementations, the method 200B is performed by a device (e.g., a controller 103 shown in FIGS. 3A-3B and FIG. 9, a CGR device 304 shown in FIG. 3A, or a user device 313 shown in FIG. 3A) with one or more processors and non-transitory memory that trains the type-agnostic object segmentation system (e.g., the type-agnostic object segmentation system 105 in FIG. 1). In some implementations, the method 200B is performed by processing logic, including hardware, firmware, software, or a combination thereof. In some implementations, the method 200B is performed by a processor executing code stored in a non-transitory computer-readable medium (e.g., a memory).

As represented by block 213, the method 200B includes obtaining a data set including a plurality of image data frames. The process of obtaining a data set is described in further detail above with reference to block 201 of method 200A in FIG. 2A.

As represented by block 215, the method 200B includes selecting an image data frame to analyze. For example, a first image data frame is selected from the plurality of image data frames for a first time period, and a second image data frame is selected from the plurality of image data frames for a second time period (e.g., based on timestamps associated with the plurality of image data frames, based on a pseudo-random process, or the like). In some implementations, the image data frame is selected from the plurality of a plurality of image data frames 122 from the set of x-labeled training objects 120.

As represented by block 217, the method 200B includes analyzing a selected image data frame from the plurality of image data frames 122. The process of analyzing the selected image data frame from the plurality of image data frames is described above in greater detail with reference to blocks 203-209 of method 200A in FIG. 2A. For the sake of brevity and so as not to obscure more pertinent aspects of the example implementations disclosed herein, the specific steps described in blocks 203-209 of method 200A in FIG. 2A will not be repeated.

As represented by block 219, the method 200B includes determining whether a comparison of the object instance representation candidate from the selected image data frame and a respective segmentation mask satisfy a threshold value. In some implementations, the threshold value corresponds to a value that filters out near misses or comparisons that are close enough to satisfy the threshold value. In some implementations, the threshold value may be a preset or deterministic value. In some implementations, each object candidate satisfies a recognition threshold value that corresponds to a confidence score.

If the object instance representation candidate does not satisfy the threshold value ("No" path from block 219), then, as represented by block 223, method 200B includes adjusting the type-agnostic object segmentation system and continuing to block 215. As represented by block 215, the method 200B includes selecting a subsequent image data frame from the plurality of image data frames. In other words, the method 200B includes repeating at least some of blocks 217-223 for the subsequently selected image data frame.

On the other hand, in some implementations, if the object instance representation candidate satisfies the threshold value ("Yes" path from block 219), then the method 200B proceeds to block 221.

In some implementations, as represented by block 221, the method 200B includes determining whether an error threshold across a plurality of image data frames is satisfied. In some implementations, the error threshold may be a preset or deterministic error threshold that is satisfied before training is complete. If the plurality of image data frames does not satisfy the error threshold ("No" path from block 221), then, as represented by block 223, method 200B includes adjusting the type-agnostic segmentation system. Alternatively, if the plurality of image data frames does not satisfy the error threshold ("No" block from block 221), the method 200B process to block 223. As represented by block 223, the method 200B includes adjusting the type-agnostic object segmentation system. In other words, the method 200B includes repeating the process for the subsequently selected image data frame.

On the other hand, in some implementations, if the plurality of image data frames satisfies the error threshold ("Yes" block from process 221), the method 200B ends due to completion of training of the type-agnostic object segmentation system.

Figure 3B:
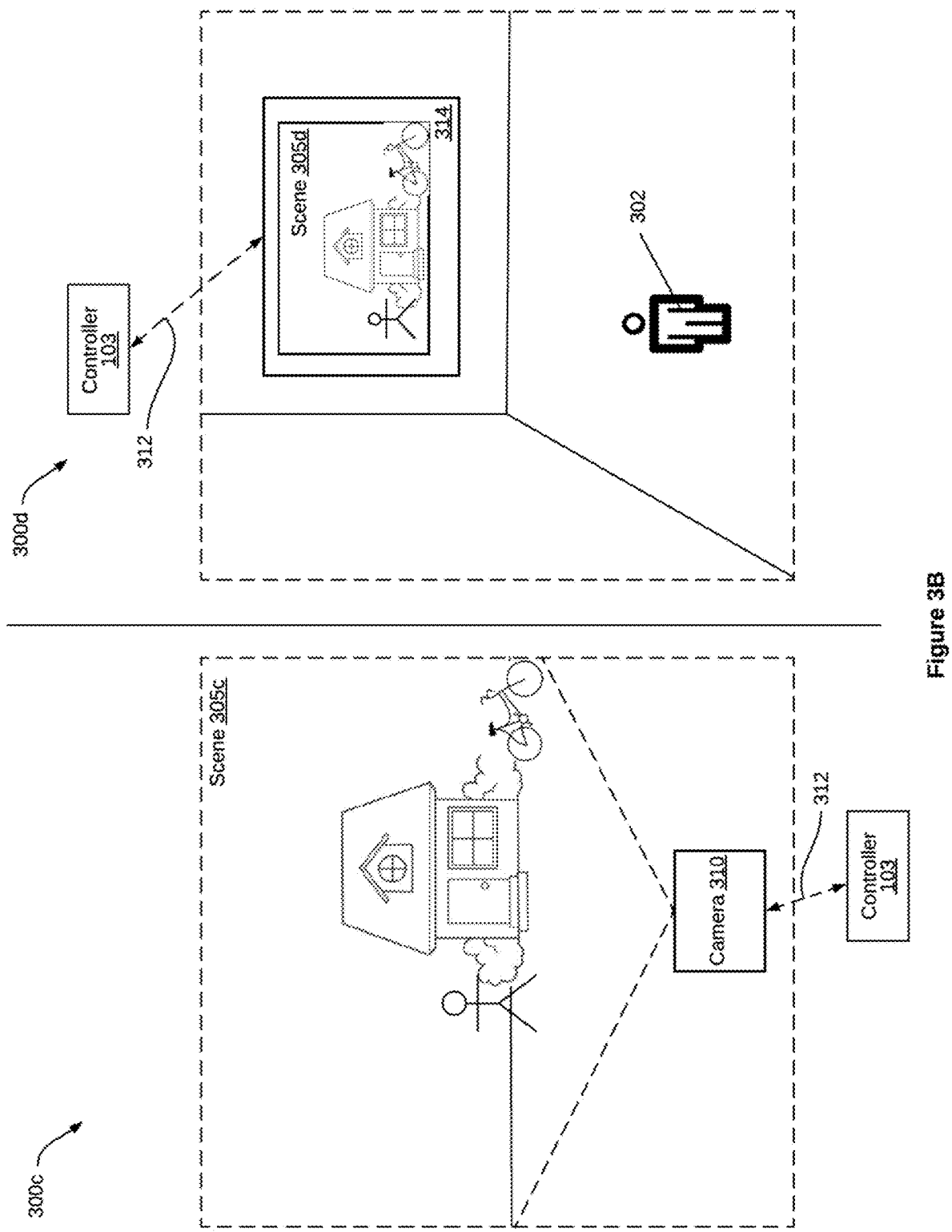

FIGS. 3A-3B are block diagrams of example operating environments in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 300a in FIG. 3A includes a controller 103, a CGR device 304 (e.g., an HMD), and a user 302. In the operating environment 300a, the user 302 wears the CGR device 304.

In some implementations, the controller 103 includes a suitable combination of software, firmware, and/or hardware. The controller 103 is described in greater detail below with respect to FIG. 9. In some implementations, the controller 103 is a computing device that is local or remote relative to a scene 305a. For example, the controller 103 is a local server situated within the scene 305a. In another example, the controller 103 is a remote server situated outside of the scene 305a (e.g., a cloud server, central server, etc.). In some implementations, the controller 103 is communicatively coupled with the CGR device 304 via one or more wired or wireless communication channels 312 (e.g., BLUETOOTH, Institute of Electrical and Electronics Engineers (IEEE) 802.11x, IEEE 802.16x, IEEE 802.3x, etc.).

In some implementations, the CGR device 304 is configured to present a CGR experience to the user 302. In some implementations, the CGR device 304 includes a suitable combination of software, firmware, and/or hardware. The CGR device 304 is described in greater detail below with respect to FIG. 10. In some implementations, the functionalities of the controller 103 are provided by and/or combined with the CGR device 304.

According to some implementations, while presenting a CGR experience, the CGR device 304 is configured to present CGR content and to enable video pass-through of the scene 305a while the user 302 is virtually and/or physically present within the scene 305a. In some implementations, while presenting a CGR experience, the CGR device 304 is configured to present CGR content and to enable optical see-through of the scene 305a.

In some implementations, the user 302 wears the CGR device 304 on his/her head. As such, the CGR device 304 includes one or more displays provided to display the CGR content (e.g., one display for each eye of the user 302). For example, the CGR device 304 encloses the field-of-view of the user 302. In some implementations, the CGR device 304 is replaced with a CGR chamber, enclosure, or room configured to present CGR content in which the user 302 does not wear the CGR device 304.

As an additional non-limiting example, the operating environment 300b in FIG. 3A includes the controller 103, the user 302, and a user device 313. In contrast to the operating environment 300a, the user 302 views the scene 305b through the user device 313 rather than wearing the CGR device 304. Example devices include, without limitation, laptops, tablets, mobile phones, or the like. In some implementations, the controller 103 is communicatively coupled with the user device 313 via the one or more wired or wireless communication channels 312 (e.g., BLUETOOTH, IEEE 802.11x, IEEE 802.16x, IEEE 802.3x, etc.). In some implementations, the functionalities of the controller 103 are provided by and/or combined with the user device 313.

As another non-limiting example, the operating environment 300c in FIG. 3B includes the controller 103 and a camera 310 (e.g., a device with one or more image sensors). In contrast to the operating environments 300a and 300b in FIG. 3A, the user 302 is not present within the scene 305c. Instead, the camera 310 captures images (sometimes also referred to herein as "image data frames" or "image frames") of the scene 305c and stores the images into a database. In some implementations, the camera 310 captures a set of images into the database, and the controller 103 generates scene data based on the set of images. In some implementations, the controller 103 is communicatively coupled with the camera 310 via the one or more wired or wireless communication channels 312 (e.g., BLUETOOTH, IEEE 802.11x, IEEE 802.16x, IEEE 802.3x, etc.). In some implementations, the functionalities of the controller 103 are provided by and/or combined with the camera 310.

As yet another additional non-limiting example, the operating environment 300d in FIG. 3B includes the controller 103, the user 302, and a display device 314. In contrast to the operating environments 300a and 300b, the user 302 views a scene 305d on a display device 314 rather than through the CGR device 304 or the user device 313. Additionally, in contrast to the operating environment 300c in FIG. 3B, the user 302 views the scene 305d on the display device 314 rather than obtaining images of the scene 305c from a database.

In some implementations, the display device 314 is configured to present media content (e.g., video and/or audio content) to the user 302. In some implementations, the display device 314 corresponds to a television (TV) or a computing device such as a desktop computer, kiosk, laptop computer, tablet, mobile phone, wearable computing device, or the like. In some implementations, the display device 314 includes a suitable combination of software, firmware, and/or hardware. In some implementations, the controller 103 is communicatively coupled with the display device 314 via one or more wired or wireless communication channels 312 (e.g., BLUETOOTH, IEEE 802.11x, IEEE 802.16x, IEEE 802.3x, etc.). In some implementations, the functionalities of the controller 103 are provided by and/or combined with the display device 314.

Figure 4:
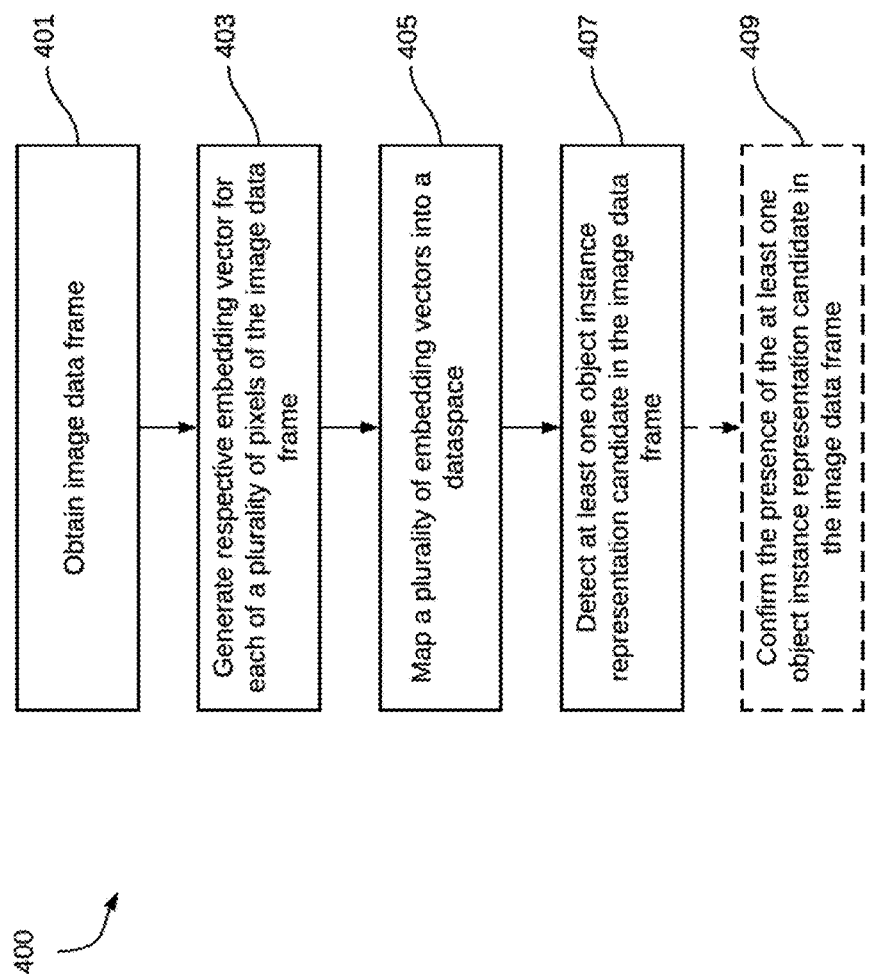
FIG. 4 is a flowchart representation of a method of detecting the presence of object instance representations in accordance with some implementations.

FIG. 4 is a flowchart representation of a method 400 of using a type-agnostic object segmentation system in order to detect the presence of object instance representations within at least one image data frame in accordance with some implementations. In various implementations, the method 400 is performed by a device with one or more processors and non-transitory memory that performs type-agnostic object segmentation (e.g., the controller 103 shown in FIGS. 3A-3B, the CGR device 304 shown in FIG. 3A, or the user device 313 shown in FIG. 3A). In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 401, the method 400 includes obtaining an image data frame (e.g., retrieving or receiving image data frames from the CGR device 304 shown in FIG. 3A, the user device 313 shown in FIG. 3A, the camera 310 shown in FIG. 3B, the display device 314 shown in FIG. 3B, a database, or the like). In some implementations, a CGR device (e.g., the CGR device 304 shown in FIG. 3 or in FIG. 10) or a component thereof (e.g., the data obtaining unit 1042 shown in FIG. 10) obtains image data from one or more external facing image sensors (e.g., the image sensor 1040 shown in FIG. 10), wherein the image data frame corresponds to images or a video stream associated with an example operating environment (e.g., the example operating environment 300d shown in FIG. 3B).

Figure 6A:
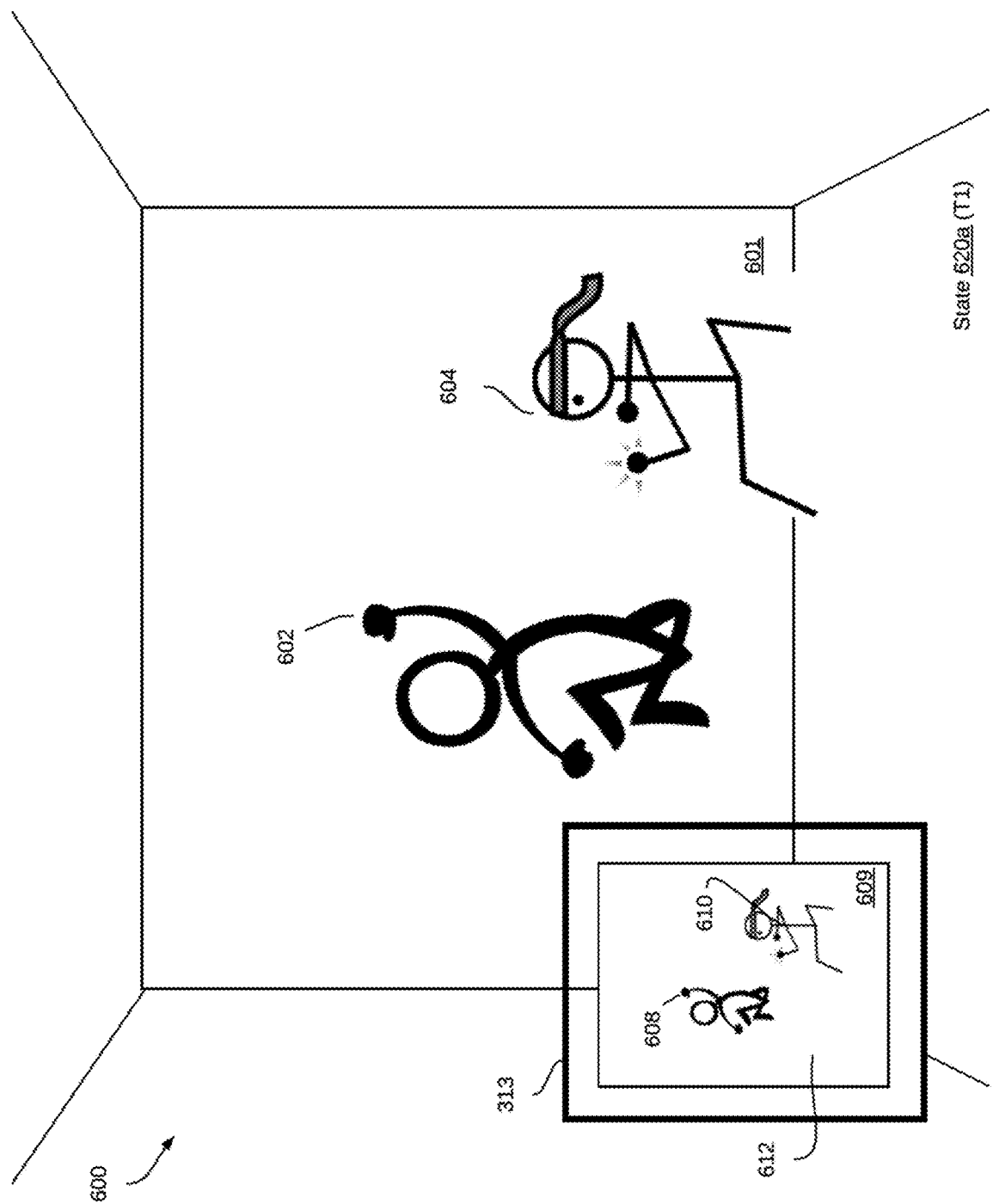
FIGS. 6A-6C illustrate an example computer generated-reality (CGR) presentation scenario in accordance with some implementations.

In some implementations, a controller (e.g., the controller 103 shown in FIGS. 3A-3B and FIG. 9) or a component thereof (e.g., the data obtaining unit 952 shown in FIG. 9) obtains an image data frame from the CGR device 304, wherein the image data frame corresponds to images or a video stream associated with the example operating environment. For example, with reference to the operating environment 300a in FIG. 3A, the image data frame corresponds to images or a video feed being presented by the CGR device 304 (e.g., an HMD, tablet, mobile phone, or the like). In another example, with reference to the operating environment 300b in FIG. 3A, the image data frame corresponds to images or a video feed being captured by the user device 313. In yet another example, with reference to the operating environment 300c in FIG. 3B, the image data frame corresponds to images or a video feed from the camera 310. In yet another example, with reference to the operating environment 300d in FIG. 3B, the image data frame corresponds to images or a video feed being presented by the display device 314. With reference to FIG. 6A, for example, the image data frame corresponds to a live video feed or a portion of the operating environment 601 associated with the field-of-view of an external-facing image sensor of the user device 313. In this example, the display 612 shows the image data frame including a portion of the operating environment 601 that contains two objects (e.g., a first person 602 that is jumping and a second person 604 that is in a fighting stance shown in FIGS. 6A-6C) in the scene.

As represented by block 403, the method 400 includes generating a respective embedding vector (e.g., the embedding vectors 504a-f shown in FIG. 5A) for each of a plurality of pixels of the image data frame. In some implementations, the respective embedding vectors are obtained from a machine learning system such as a neural network (e.g., a convolutional neural network (CNN) 1120 shown in FIG. 11, deep-learning neural network, or the like). In some implementations, the respective embedding vector includes one or more labels, such as one or more primary labels corresponding to one or more objects and one or more sub-labels corresponding to features. In some implementations, the method 400 includes generating a label for each pixel in the image data frame. In some implementations, each label includes an object reference or the like. In some implementations, the method 400 further includes generating one or more features for each pixel in the image data frame. In some implementations, the features correspond to object color, object size, object shape, or the like.

Figure 5B:
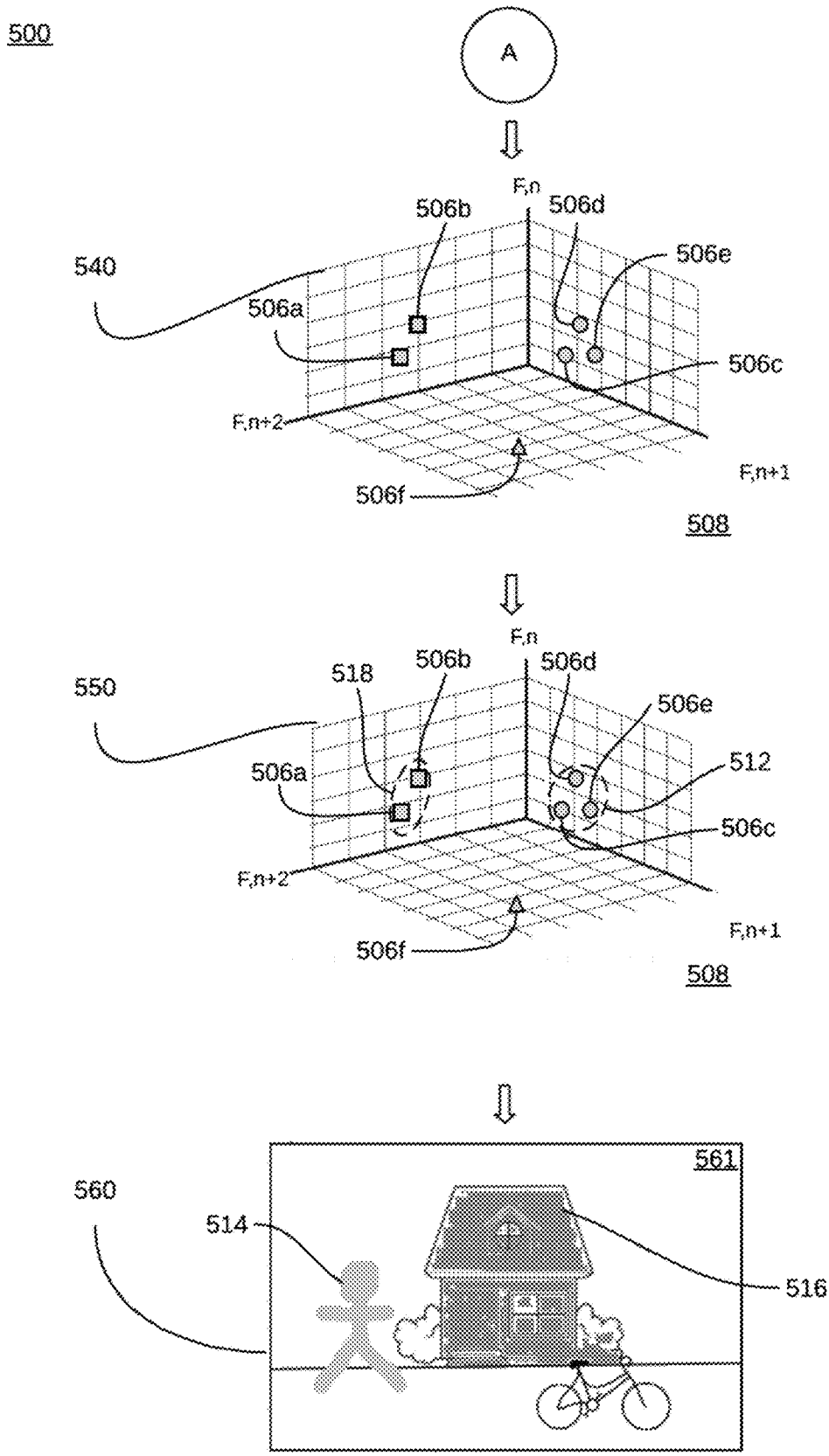

As represented by block 405, the method 400 includes mapping a plurality of embedding vector representations into a dataspace (e.g., the embedding vector representations mapped in a dataspace 508 shown in FIG. 5B), wherein the dataspace is defined by a dimensionality of the plurality of embedding vectors. In some implementations, the controller (e.g., the controller 103 shown in FIG. 1 or FIG. 9) or a component thereof (e.g., the mapping unit 956 shown in FIG. 9) maps a plurality of embedding vector representations into the dataspace.

As represented by block 407, the method 400 includes detecting at least one object instance representation candidate in the image data frame by disambiguating the plurality of embedding vector representations within the dataspace (e.g., disambiguated vector representations mapped in a dataspace 508 shown in FIG. 5B). In some implementations, disambiguating the plurality of embedding vector representations further includes satisfying a disambiguation threshold value. In various implementations, the disambiguation threshold value corresponds to a distance between the plurality of embedding vector representations within the dataspace. In some implementations, the controller (e.g., the controller 103 shown in FIG. 1 or FIG. 9) or a component thereof (e.g., the disambiguating unit 958 shown in FIG. 9) disambiguates the plurality of embedding vector representations within the dataspace.

In some implementations, the device performs disambiguation by a supervised learning process. In some implementations, the supervised learning process includes analyzing embedding vector representations by mapping the pixel-level embedding vector representations to a unity sphere. In some implementations, the supervised learning process includes analyzing disambiguation with a user manually selecting objects within the image data frame. In some implementations, the device performs disambiguation by an unsupervised learning process. In some implementations, the unsupervised learning process includes analyzing the embedding vector representations with a normalized cuts method. In some implementations, the unsupervised learning process includes analyzing disambiguation with a mean shift method.

While specific examples of disambiguation with unsupervised learning techniques and supervised learning techniques are highlighted above, those skilled in the art will appreciate that various other methods of analyzing a plurality of embedding vector representations with unsupervised learning processes and supervised learning processes can also be used. As such, the specific examples discussed above are not meant to be limiting.

Optionally, as represented by block 409, the method 400 includes confirming the presence of the at least one object instance representation candidate (e.g., a first object instance representation candidates 514 and a second object instance representation candidate 516 shown in FIG. 5B) in the image data frame (e.g., the labeled image data frame 115 shown in FIG. 5B).

FIGS. 5A-5B illustrate a process 500 for detecting the presence of object instance representations in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, a trained type-agnostic object segmentation system is provided in order to detect the presence of object instance representations within at least one unlabeled image data frame 501. The trained type-agnostic object segmentation system also detects those object instance representations as an object that the type-agnostic object segmentation system has been trained to detect as well as objects that the type-agnostic object segmentation system was not trained to detect.

Figure 7:
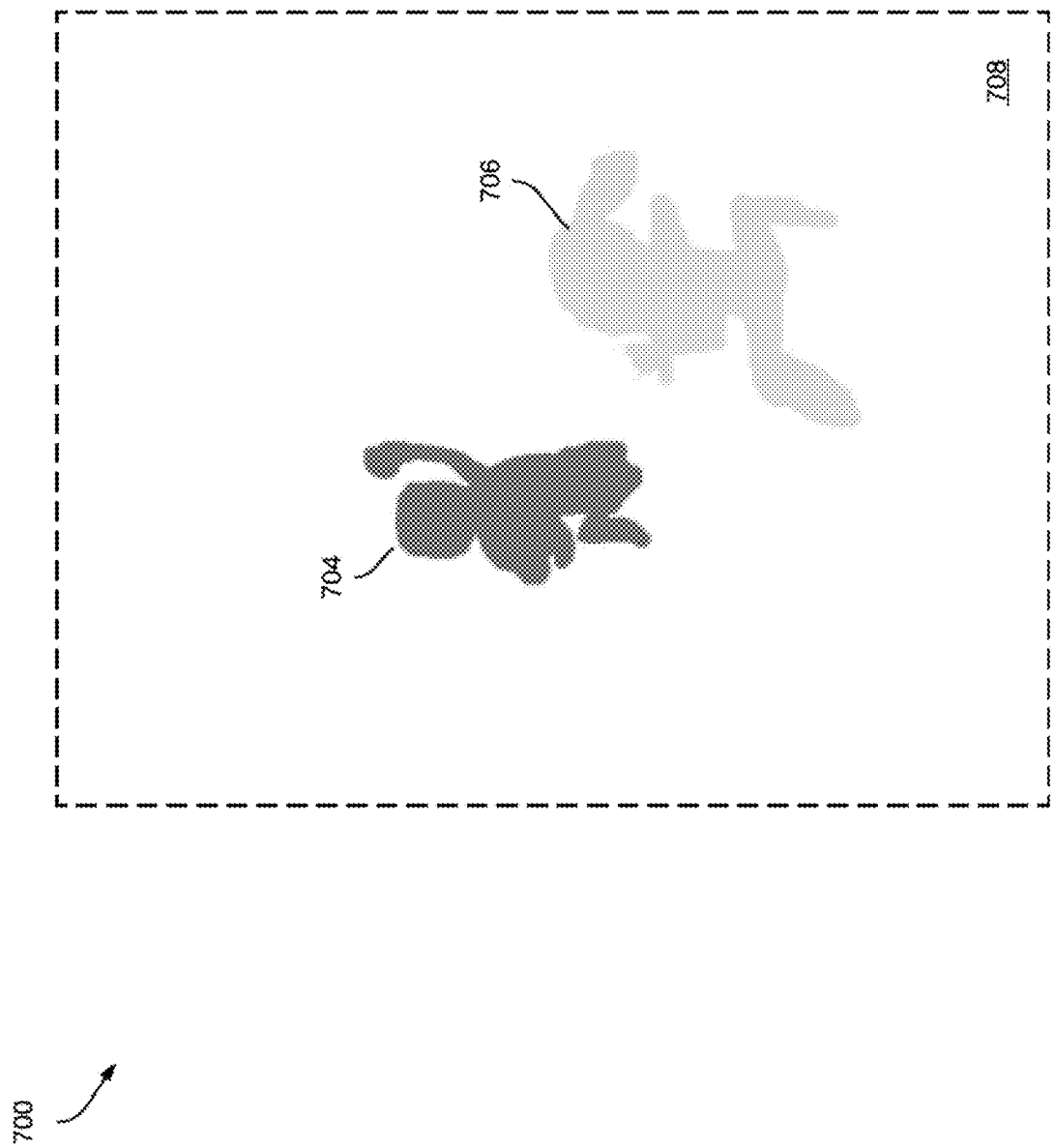
FIG. 7 illustrates a backend example of a device surveying a scene in accordance with some implementations.

In some implementations, the trained type-agnostic object segmentation system is implemented in a controller 103 (e.g., the controller 103 shown in FIGS. 3A-3B and the controller 701 shown in FIG. 7). As mentioned above, in some implementations, the controller 103 includes a suitable combination of software, firmware, and/or hardware. The controller 103 is described in greater detail below with respect to FIG. 9.

In some implementations, the process 500 illustrates the trained type-agnostic object segmentation system obtaining (510) an unlabeled image data frame 501. The unlabeled image data frame 501 corresponds to an image data frame containing unknown objects that are not marked with any object instance representations or segmentation masks. Those or ordinary skill in the art will appreciate that the unlabeled image data frame 501 may be obtained from myriad sources in various implementations. In one example, with reference to FIG. 3A, the controller 103 obtains the unlabeled image data frame 501 from a CGR device 304 (e.g., an HMD) that captures images of the scene 305a. In another example, with reference to FIG. 3A, the controller 103 obtains the unlabeled image data frame 501 from a user device 313 (e.g., a tablet, mobile phone, or the like) that captures images of the scene 305b. With reference to FIG. 6A, for example, the image data frame corresponds to a live video feed or a portion of the operating environment 601 associated with the field-of-view of an external facing image sensor of the user device 313. In yet another example, with reference to FIG. 3B, the controller 103 obtains the unlabeled image data frame 501 from a camera 310 that captures images of the scene 305c. In yet another example, with reference to FIG. 3B, the controller 103 obtains the unlabeled image data frame 501 from the display device 314 that dis displaying the scene 305d.

As a non-limiting example and for the sake of brevity, FIGS. 5A-5B show a process for analyzing a few pixels rather than analyzing each pixel in the plurality of image data frames. While some specific pixels and features are illustrated, those of ordinary skill in the art will appreciate from the present disclosure that various pixels and features have not been illustrated for the sake of brevity and so as not to obscure the more pertinent aspects of FIGS. 5A-5B. However, those of ordinary skill in the art will appreciate from the present disclosure that this process (e.g., method 400) can occur on each pixel in the plurality of image data frames.

In some implementations, the process 500 illustrates the trained type-agnostic object segmentation system analyzing (520) a plurality of pixels (e.g., 503a-f) within the image data frame 501. As a non-limiting example, the process includes analyzing a subset of the pixels in the unlabeled image data frame 501 to analyze. Here, the unlabeled image data frame 501 contains three unknown objects (e.g., a first unknown object that corresponds to a person, a second unknown object that corresponds to a house, and a third unknown object that corresponds to a bicycle). For convenience of reference in FIG. 5A, pixels 503a and 503b associated with the first unknown object are represented with a square pixel, pixels 503c, 503d, and 503e associated with the second unknown object are represented with circles, and pixel 503f associated with the third unknown object is represented with a triangle. The shapes of the representations for the various pixels are for reference purposes only and to track the pixels as they go through the method 400.

In some implementations, the process 500 illustrates the trained type-agnostic object segmentation system generating (530) a plurality of respective embedding vectors 504a-f for each of a plurality of pixels 503a-f. As shown in FIG. 5A, the two embedding vectors 504a-b associated with the first unknown object are depicted as solid line vectors, the three embedding vectors 504c-e associated with the second unknown object are depicted as dashed line vectors, and an embedding vector 504f associated with the third unknown object is depicted as a dotted line vector.

As continued in FIG. 5B, in some implementations, the process 500 illustrates the trained type-agnostic object segmentation system mapping (540) the embedding vector representations 506a-f into a dataspace 508. As shown in FIG. 5B, the plurality of embedding vector representations 506a-b that are associated with the first unknown object appear to be mapped closely together in the dataspace 508. Accordingly, the plurality of embedding vector representations 506c-e is associated with the second unknown object also appears to be mapped closely together in the dataspace 508. The embedding vector representation 506f appears by itself because the trained type-agnostic object segmentation system has mapped a single pixel associated with the third unknown object. Although the embedding vector representations 506a-f in the dataspace 508 are associated with three dimensions, it will be obvious to one of ordinary skill in the art that in various implementations, the dataspace is associated with n-dimensions.

In some implementations, the process 500 illustrates the trained type-agnostic object segmentation system disambiguating (550) the plurality of embedding vector representations 506a-f in order to determine which vectors are associated with which unknown objects. As confirmed by the disambiguation process, which has been described above in FIG. 4, the two embedding vector representations 506a-b are clustered together as an object representation 518 in the dataspace 508, and the three embedding vector representations 506c-e are clustered together as an object representation 512 in the dataspace 508.

In some implementations, the process 500 illustrates the trained type-agnostic object segmentation system detecting (560) an object instance representation. In some implementations, the trained type-agnostic object segmentation system detects an object instance representation based at least in part on the disambiguated vectors mapped in the dataspace 508. Here, the trained type-agnostic object segmentation system detects a first object instance representation 514 of the first unknown object (e.g., the person) in a labeled image data frame 561. In contrast to the unlabeled image data frame 501, the labeled image data frame 561 includes at least one object recognition annotation that is associated with an object instance representation (e.g., the first object instance representation 514 or the second object instance representation 516). Similarly, the trained type-agnostic object segmentation system also detects a second object instance representation 516 of the second unknown object (e.g., the house) in the labeled image data frame 561.

While specific examples are highlighted above for analyzing pixels 503a-f from an unlabeled image data frame 501, those skilled in the art will appreciate that any number of pixels and any number of image data frames can be analyzed using the trained type-agnostic object segmentation system and methods described above. As such, the specific examples and numbers of pixels discussed above are not meant to be limiting.

Figure 6B:
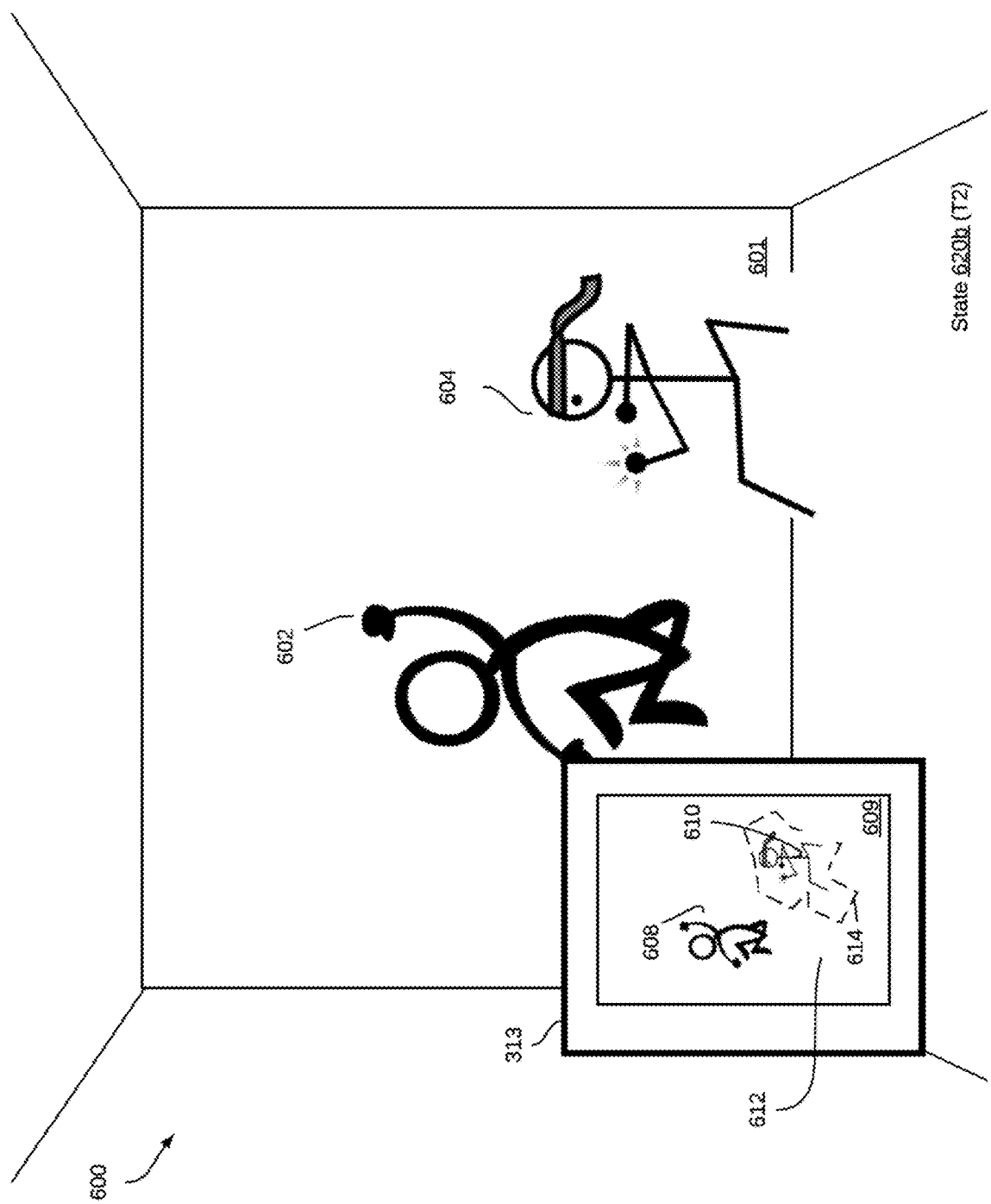
Figure 6C:
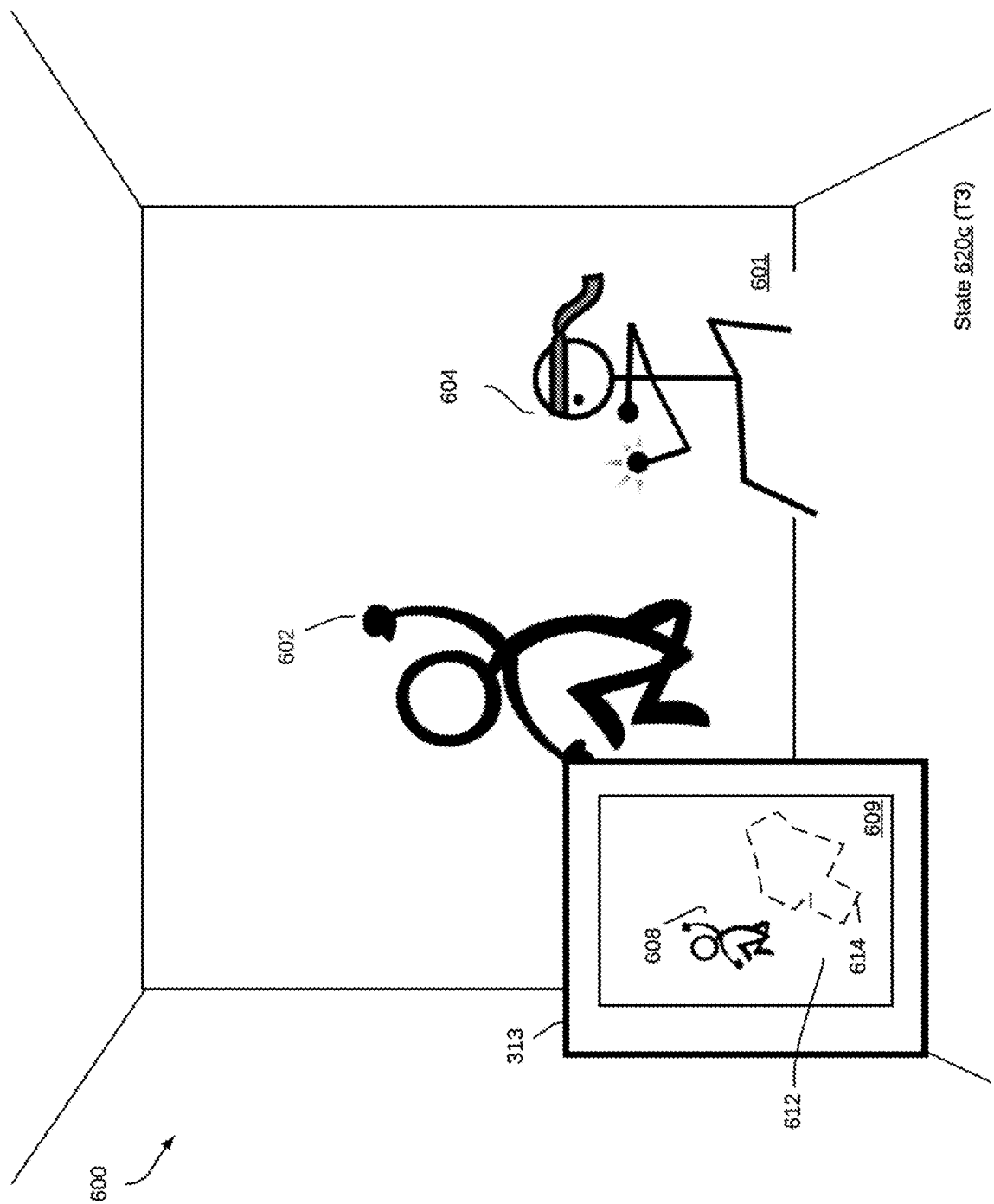

FIGS. 6A-6C illustrates an example CGR presentation scenario 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 6A illustrates a scene 601 with a user device 313 (e.g., the user device 313 shown in FIG. 3A) surveying the scene 601 in a state 620a (at T1 or a first time period). As shown in FIG. 6A, the scene 601 includes a first person 602 that is jumping and a second person 604 that is in a fighting stance. In this example, a portion of the scene 601 is within the field-of-view of the user device 313, where the field-of-view is associated with an external-facing image sensor of the user device 313 (e.g., a tablet or mobile phone). In other words, the user 302 in FIG. 3A is looking at the scene 601 through the user device 313. Accordingly, a display 612 of the user device 313 (e.g., video pass-through of the scene 601) displays a representation 609 of the scene 601 including a first object representation 608 associated with the first person 602 that is jumping and a second object representation 610 associated with the second person 604 that is in a fighting stance.

In some implementations, a device counts the number of distinct objects in the scene 601. For example, in FIG. 6A, there are two distinct objects: a first object (e.g., the first person 602 that is jumping) and a second object (e.g., the second person 604 that is in a fighting stance). As mentioned above, the device does not define what the objects are, but rather that the scene 601 contains two distinct objects.

In some implementations, the user device 313 generates a first object representation 608 associated with the first person 602 that is jumping and a second object representation 610 associated with the second person 604 that is in a fighting stance based on a point cloud for each object and an object classification set. For example, the point cloud associated with first object representation 608 is based on one or more images of the scene 601 including a plurality of pixels (e.g., a matrix of pixels) that include the first person 602 that is jumping. In various implementations, the point cloud includes a plurality of three-dimensional points. In various implementations, the point cloud is based on the image of the scene 601 and previous images of the scene 601 taken at different angles to provide stereoscopic imaging. In various implementations, a point in the point cloud is associated with metadata, such as a color texture, reflectance, or transmittance of the point on the surface in the scene 601, or a confidence in the position of the point on the surface of the scene 601.

In various implementations, the object classification set is based on the objects within an image of the scene 601. The object classification set includes one or more elements, each element including a respective subset of the plurality of pixels (of the image of the scene 601) classified as a respective object in the scene 601. In various implementations, the object classification set is generated based on segmentation masks. As mentioned above, the device counts the number of distinct objects within an image data frame rather than attempting to define what the distinct objects are within the image data frame. The segmentation masks are not associated with semantic masks. Instead, a device utilizes instance segmentation methods to detect the number of objects in the image data frame. For example, the device (e.g., the controller 103 shown in FIGS. 3A-3B or the CGR device shown in FIGS. 3 and 10) separates objects in the image data frame rather than defining the objects in an image data frame. To that end, in some implementations, the type-agnostic object segmentation system will separate the objects in the image data and label them as "object 1", "object 2", etc.

FIG. 6B illustrates an example CGR presentation scenario 600 in a state 620b (at T2 or a second time period) in accordance with some implementations. FIG. 6B illustrates a scene 601 with a user device 313 (e.g., the CGR device shown in FIGS. 3 and 10) surveying the scene 601. FIG. 6B illustrates the user device 313 detecting and/or tracking a second person 604 that is in a fighting stance from the scene 601 using segmentation masks. In this example, a second object representation 610 is demarked using a segmentation mask 614. In some implementations, the segmentation mask 614 may be visible to the user on the display 612 of the user device 313. In some implementations, the segmentation mask 614 is not visible to the user on the display 612 of the user device 313. Although not shown, the first object representation 608 can also be demarked using a separate segmentation mask. The detecting and/or tracking functions are described in greater detail in FIG. 8.

FIG. 6C illustrates an example CGR presentation scenario 600 in a state 620c (at T3 or a third time period) in accordance with some implementations. FIG. 6C illustrates the user 302 removing or editing the second object representation 610 based on a segmentation mask that is generated by the user device 313. As such, a user may now edit or remove the second object representation 610 that is demarked with the segmentation mask 614 from the user device 313. In accordance with the previous example in FIG. 6B, the user 302 selects the second object representation 610 for removal on the user device 313. To that end, the display 612 of the user device 313 no longer displays the representation of the second object (e.g., the second object representation 610 shown in FIG. 6B) to the user 302.

FIG. 7 illustrates a backend example of a device surveying a scene in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

In some implementations, FIG. 7 illustrates a backend example 700 associated with the user device 313 surveying the scene 601 in FIGS. 6A-6C. In FIG. 7, a representation of a scene 708 is displayed with different elements (respective subsets of the plurality of pixels) colored with different colors. In FIG. 7, the object classification set includes two candidate objects, a first candidate object 704 including a subset of the plurality of pixels corresponding to the first object 602 in FIGS. 6A-6C and a second candidate object 706 including a subset of the plurality of pixels corresponding to the second object 604 in FIGS. 6A-6C. In accordance with the above example, the candidate objects 704 and 706 may be marked in different colors, which delineate different object instances. In some implementations, the different candidate objects or object instances may be labeled with a confidence or probability score that reflects the confidence of the type-agnostic object segmentation system in a particular class label. In various implementations, the type-agnostic object segmentation system generates an object classification set using a neural network applied to the image of the scene. In various implementations, an element of the object classification set includes a label indicating the object in the scene (e.g., object #1, object #2, etc.).

Figure 8:
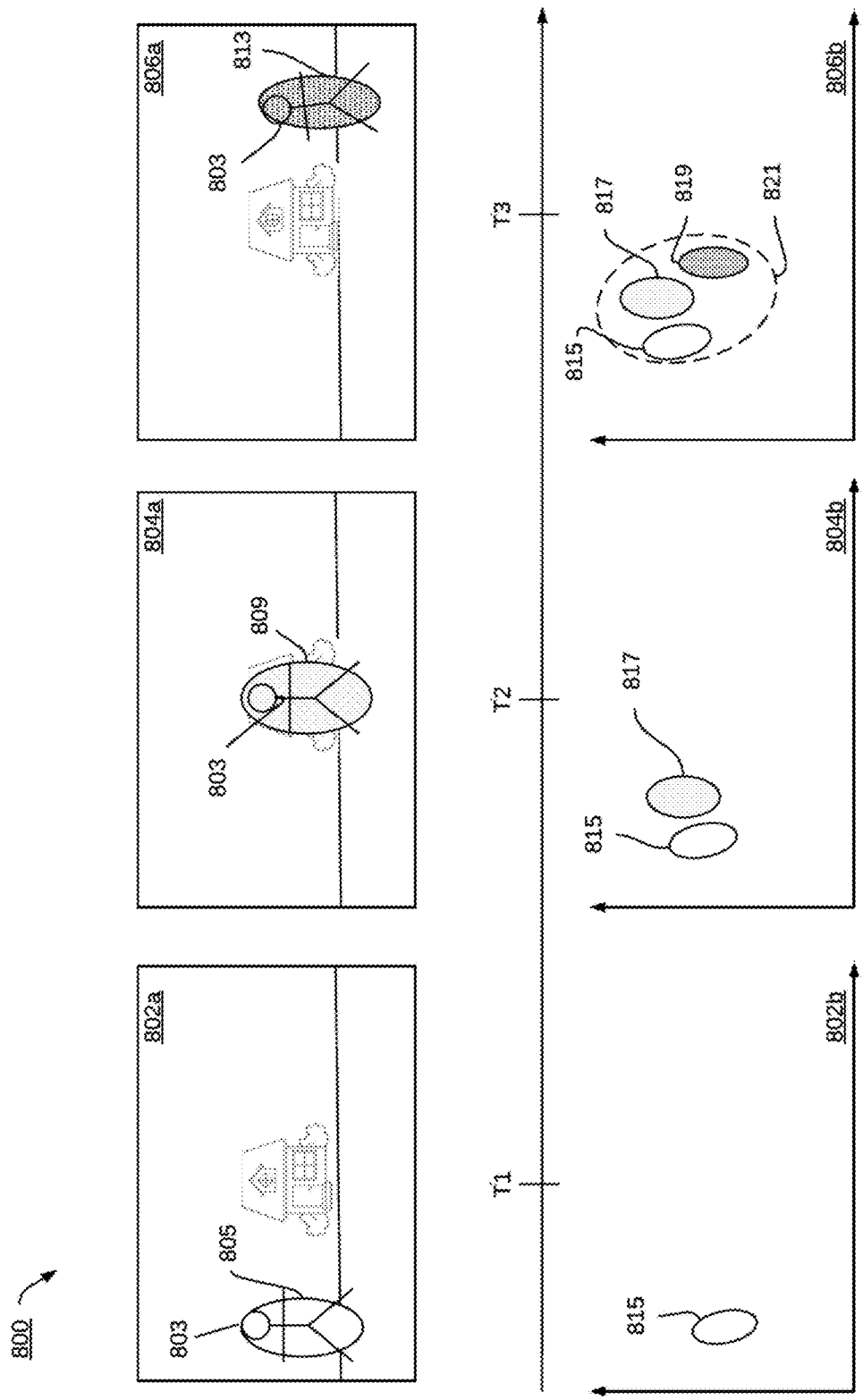
FIG. 8 illustrates a process for tracking an object across a sequence of image data frames in accordance with some implementations.

FIG. 8 illustrates a process for tracking an object across a sequence of image data frames in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 8 illustrates a temporal relationship 800 between a sequence of image data frames and dataspaces with embedding vector representations generated therefrom in accordance with some embodiments. As shown in FIG. 8, the temporal relationship 800 includes image data frames 802a, 804a, and 806a and resulting cumulative embedding vector representations mapped in dataspaces 802b, 804b, and 806b at plurality of time periods (e.g., T1, T2, and T3).

In some implementations, a device (e.g., the controller 103 in FIGS. 3A-3B and FIG. 9) detects and tracks an unknown object of interest (e.g., an unknown object 803) within the image data frames 802a, 804a, and 806a over the plurality of time periods (e.g., T1, T2, and T3). As shown in FIG. 8, the sequence of image data frames comprises a first image data frame 802a for a first time period (e.g., T1) that includes the unknown object 803 on the left side of the scene. For the first time period, the unknown object 803 is associated with a plurality of pixels 805 (e.g., pixels comprising the unknown object 803, pixels within a radius of the center of mass of the unknown object 803, or the like). In turn, for the first time period, the device generates a plurality of embedding vectors for the plurality of pixels 805 (e.g., one embedding vector for each pixel) corresponding to the unknown object 803, and the device maps a plurality of embedding vector representations 815 into a first dataspace 802b. The above process is described in greater detail in FIGS. 4 and 5A-5E.

In some implementations, the device obtains a second image data frame 804a for a second time period (e.g., at T2). The second image data frame 804a also contains the unknown object 803, but as compared to the first image data frame 802a, the unknown object 803 is now located in the middle of the scene. For the second time period, the unknown object 803 is associated with a plurality of pixels 809. In turn, for the second time period, the device generates a plurality of respective embedding vectors for the plurality of pixels 809 corresponding to the unknown object 803, and the device maps a plurality of embedding vector representations 817 into a second dataspace 804b. As shown in FIG. 8, the second dataspace 804b includes both the plurality of embedding vector representations 815 for the first time period and the plurality of embedding vector representations 817 for the second time period.

In some implementations, the device obtains a third image data frame 806a for a third time period (e.g. at T3). The third image data frame 806a again contains the unknown object 803, but compared to the first image data frame 802a and the second image data frame 804a, the unknown object 803 is now located at the right side of the scene. For the third time period, the unknown object 803 is associated with a plurality of pixels 813. In turn, for the third time period, the device generates a plurality of respective embedding vectors for the plurality of pixels 813 corresponding to the unknown object 803, and the device maps a plurality of embedding vector representations 819 into a third dataspace 806b. As shown in FIG. 8, the third dataspace 806b includes the plurality of embedding vector representations 815 for the first time period, the plurality of embedding vector representations 817 for the second time period, and the plurality of embedding vector representations 819 for the third time period.

According to some implementations, the device disambiguates the plurality of embedding vector representations (e.g., including the plurality of embedding vector representations 815 for the first time period, the plurality of embedding vector representations 817 for the second time period, and the plurality of embedding vector representations 819 for the third time period) according to the various methods described in FIG. 4. In some implementations, pixels that belong to a same object can be identified by being mapped within a particular space 821. As explained above in block 407 in FIG. 4, the type-agnostic object segmentation system uses various disambiguation techniques to indicate which pixels are associated with a same object and which pixels are associated with different objects by value analyzing the distances between embedding vector representations within the dataspace.

Figure 9:
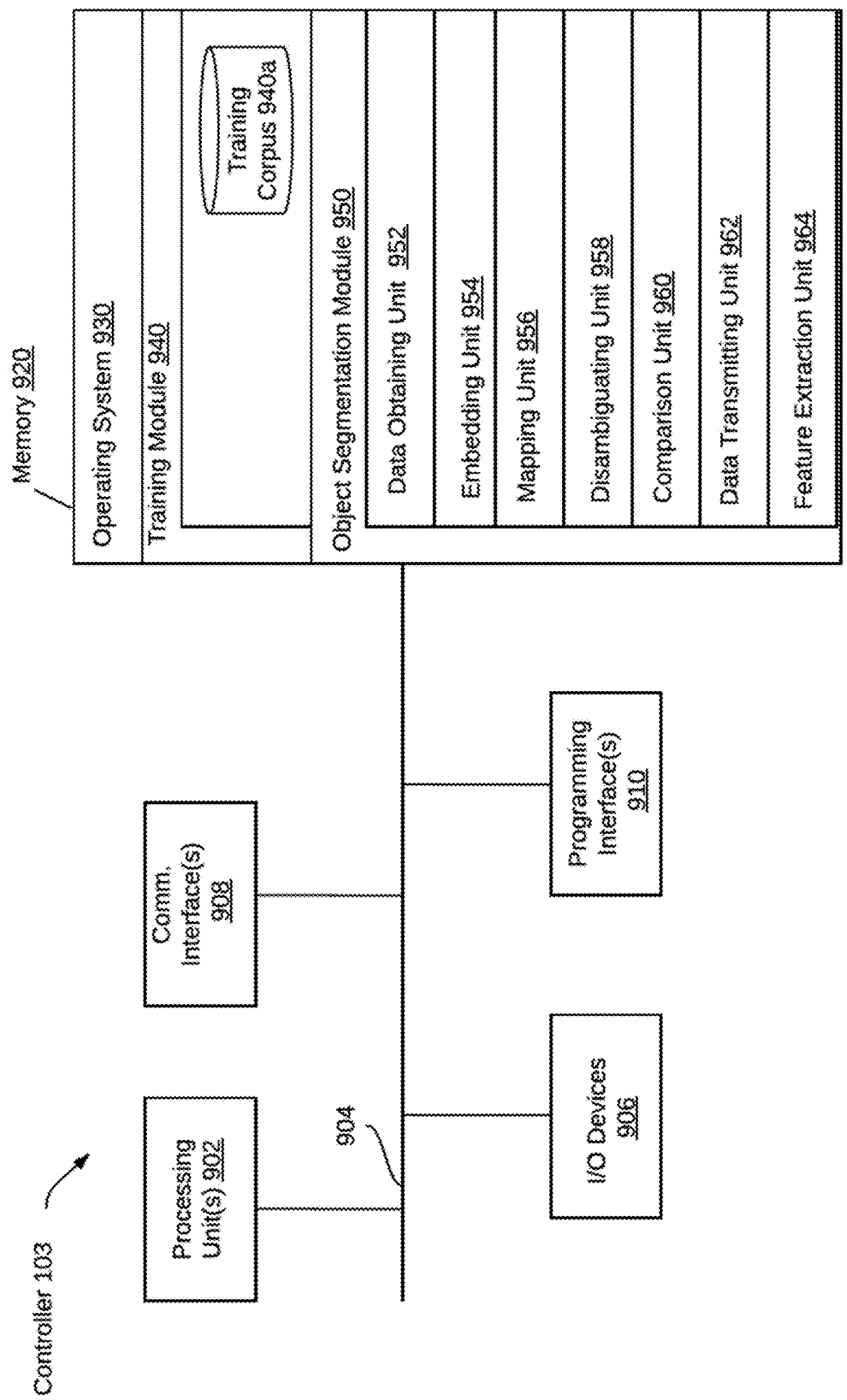
FIG. 9 is a block diagram of an example controller in accordance with some implementations.

FIG. 9 is a block diagram of an example of a controller (e.g., the controller 103 shown in FIGS. 3A-3B) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the controller 103 includes one or more processing units 902 (e.g., microprocessors, application-specific integrated-circuits (ASICs), field-programmable gate arrays (FPGAs), graphics processing unit (GPUs), central processing units (CPUs), processing cores, and/or the like), one or more input/output (I/O) devices and sensors 906, one or more communications interface 908 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning systems (GPS), infrared (IR), BLUETOOTH, ZIGBEE, and/or the like type interfaces), one or more programming (e.g., I/O) interfaces 910, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of a keyboard, a mouse, a touchpad, a joystick, one or more microphones, one or more speakers, one or more image sensors, one or more displays, and/or the like.

The memory 920 includes high-speed random-access memory, such as DRAM, SRAM, DDR, RAM, or other random-access solid-state memory devices, and may include non-volatile memory, such as one or more magnetic disk storage devices, optical disk storage devices, flash memory devices, or other non-volatile solid-state storage devices. The memory 920 optionally includes one or more storage devices remotely located from the one or more one or more processing units 902. The memory 920 comprises a non-transitory computer readable storage medium. In some implementations, the memory 920 or the non-transitory computer readable storage medium of the memory 920 stores the following programs, modules, and data structures, or a subset thereof including an optional operating system 930, a training module 940, and an object segmentation module 950. In some implementations, one or more instructions are included in a combination of logic and non-transitory memory.

The operating system 930 includes procedures for handling various basic system services and for performing hardware-dependent tasks.

In some implementations, the training module 940 is configured to train the various portions of the type-agnostic object segmentation system (e.g., the type-agnostic object segmentation system 105 shown in FIG. 1). In some implementations, the training module 940 includes a training corpus 940*a* (e.g., the set of x-labeled training objects 120 shown in FIG. 1). To that end, in various implementations, training module 940 includes instructions and/or logic therefor, and heuristics and metadata therefor.

In some implementations, the object segmentation module 950 is configured to detect the presence of object instance representations within image data frames. As shown in FIG. 9, in various implementations, the object segmentation module 950 includes a data obtaining unit 952, an embedding unit 954, a mapping unit 956, a disambiguating unit 958, a comparison unit 960, a data transmitting unit 962, and a feature extraction unit 964.

In some implementations, the data obtaining unit 952 is configured to obtain data (e.g., presentation data, user interaction data, sensor data, location data, etc.) from at least one of the sensors associated with the controller 103 in FIGS. 3A-3B, the CGR device 304 in FIG. 3A, the user device 313 in FIG. 3A, the camera 310 in FIG. 3B, and the display device 314 in FIG. 3B. For example, the data obtaining unit 952 obtains sensor data from the CGR device 304 that includes image data from external facing image sensors of the CGR device 304, wherein the image data frame corresponds to images or a video stream capturing the operating environment 300. To that end, in various implementations, the data obtaining unit 952 includes instructions and/or logic therefor, and heuristics and metadata therefor.

In some implementations, the embedding unit 954 is configured to generate embedding vectors for a plurality of image data frames. To that end in various implementations, the embedding unit 954 includes instructions and/or logic therefor, and heuristics and metadata therefor.

In some implementations, the mapping unit 956 is configured to map a plurality of embedding vector representations into a dataspace. To that end in various implementations, the mapping unit 956 includes instructions and/or logic therefor, and heuristics and metadata therefor.

In some implementations, the disambiguating unit 958 is configured to disambiguate the plurality of embedding vector representations within the dataspace in order to detect at least one object instance representation candidate in an image. To that end in various implementations, the disambiguating unit 958 includes instructions and/or logic therefor, and heuristics and metadata therefor.

In some implementations, the comparison unit 960 is configured to compare an object instance representation candidate against a respective segmentation mask. To that end in various implementations, the comparison unit 960 includes instructions and/or logic therefor, and heuristics and metadata therefor.

In some implementations, the data transmitting unit 962 is configured to transmit data (e.g., presentation data, location data, etc.) to at least one of the CGR device 304 in FIG. 3A, the user device 313 in FIG. 3A, and the display device 314 in FIG. 3B. To that end in various implementations, the data transmitting unit 962 includes instructions and/or logic therefor, and heuristics and metadata therefor.

In some implementations, the feature extraction unit 964 is configured to extract one or more features from a pixel in the image data frame. To that end in various implementations, the feature extraction unit 964 instructions and/or logic therefor, and heuristics and metadata therefor.

Although the data obtaining unit 952, the embedding unit 954, the mapping unit 956, the disambiguating unit 958, the comparison unit 960, the data transmitting unit 962, and the feature extraction unit 964 are shown as residing on a single device (e.g., the controller 103), it should be understood that in some implementations, any combinations of the data obtaining unit 952, the embedding unit 954, the mapping unit 956, the disambiguating unit 958, the comparison unit 960, the data transmitting unit 962, and the feature extraction unit 964 may be located in separate computing devices.

Moreover, FIG. 9 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 10:
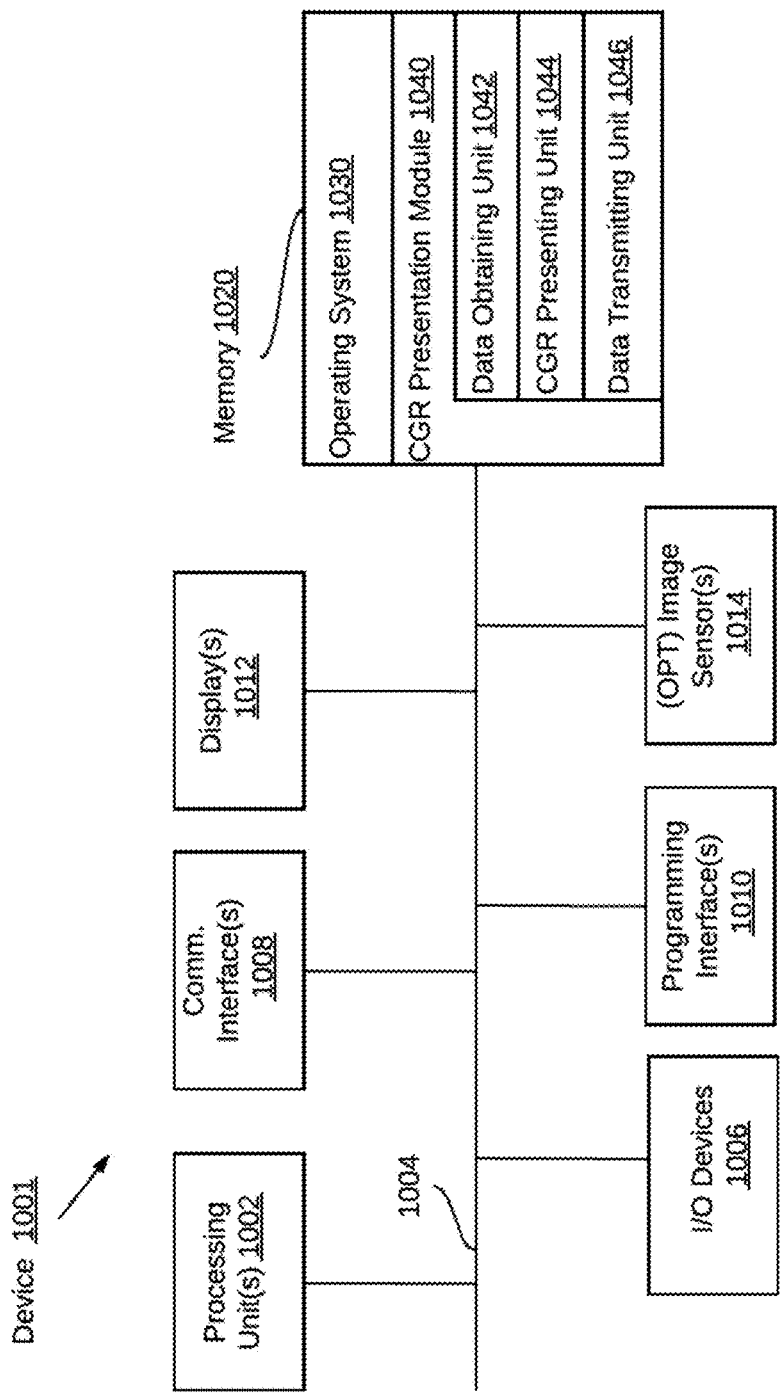
FIG. 10 is a block diagram of an example device in accordance with some implementations.

FIG. 10 is a block diagram of an example of a device 1001 (e.g., the CGR device 304 shown in FIG. 3A, or the user device 313 shown in FIG. 3A) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 1001 includes one or more processing units 1002 (e.g., microprocessors, ASICs, FPGAs, GPUs, CPUs, processing cores, and/or the like), one or more I/O devices and sensors 1006, one or more communications interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interfaces), one or more programming (e.g., I/O) interfaces 1010, one or more displays 1012, one or more optional exterior and/or interior-facing image sensors 1014, a memory 1020, and one or more communication buses 1004 for interconnecting these and various other components.

In some implementations, the one or more communication buses 1004 include circuitry that interconnects and controls communications between system components.

In some implementations, the one or more displays 1012 are capable of presenting a CGR experience or CGR content (e.g., to the user 302 in FIGS. 3A-3B). In some implementations, the one or more displays 1012 are also configured to present flat video content to the user (e.g., a 2-dimensional or "flat" audio video interleave (AVI), flash video (FLV), Windows Media Video (WMV), or the like file associated with a TV episode or a movie, or live video pass-through of the operating environments 300a, 300b, and 300d). In some implementations, the one or more displays 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro mechanical systems (MEMS), and/or the like display types. In some implementations, the one or more displays 1012 correspond to diffractive, reflective, polarized, holographic, etc. waveguide displays. For example, the device 1001 includes a single display. In another example, the device 1001 includes a display for each eye of the user.

In some implementations, the one or more optional exterior- and/or interior-facing image sensors 1014 are configured to obtain image data frames. For example, the one or more optional exterior and/or interior-facing image sensors 1014 correspond to one or more RGB cameras (e.g., with a complementary metal-oxide-semiconductor (CMOS) image sensor, or a charge-coupled device (CCD) image sensor), infrared (IR) image sensors, event-based cameras, and/or the like.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium. In some implementations, the memory 1020 or the non-transitory computer readable storage medium of the memory 1020 stores the following programs, modules and data structures, or a subset thereof including an optional operating system 1030 and a CGR presentation module 1040.

The operating system 1030 includes procedures for handling various basic system services and for performing hardware dependent tasks. In some implementations, the CGR presentation module 1040 is configured to present CGR content to the user via the one or more displays 1012. To that end, in various implementations, the CGR presentation module 1040 includes a data obtaining unit 1042, a CGR presenting unit 1044, and a data transmitting unit 1046.

In some implementations, the data obtaining unit 1042 is configured to obtain data (e.g., presentation data, interaction data, location data, etc.) from at least one of the one or more I/O sensors 1006 associated with the device 1001, the controller 103 in FIGS. 3A-3B, and a display device 314 in FIG. 3B. To that end, in various implementations, the data obtaining unit 1042 includes instructions and/or logic therefor, and heuristics and metadata therefor.

In some implementations, the CGR presenting unit 1044 is configured to present CGR content via the one or more displays 1012. To that end, in various implementations, the CGR presenting unit 1044 includes instructions and/or logic therefor, and heuristics and metadata therefor.

In some implementations, the data transmitting unit 1046 is configured to transmit data (e.g., presentation data, location data, etc.) to at least one of the controller 103 in FIGS. 3A-3B and the display device 314 in FIG. 3B. To that end, in various implementations, the data transmitting unit 1046 includes instructions and/or logic therefor, and heuristics and metadata therefor.

Although the data obtaining unit 1042, the CGR presenting unit 1044, and the data transmitting unit 1046 are shown as residing on a single device (e.g., the device 1001), it should be understood that in some implementations, any combination of the data obtaining unit 1042, the CGR presenting unit 1044, and the tracking unit 1046 may be located in separate computing devices.

Moreover, FIG. 10 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 11:
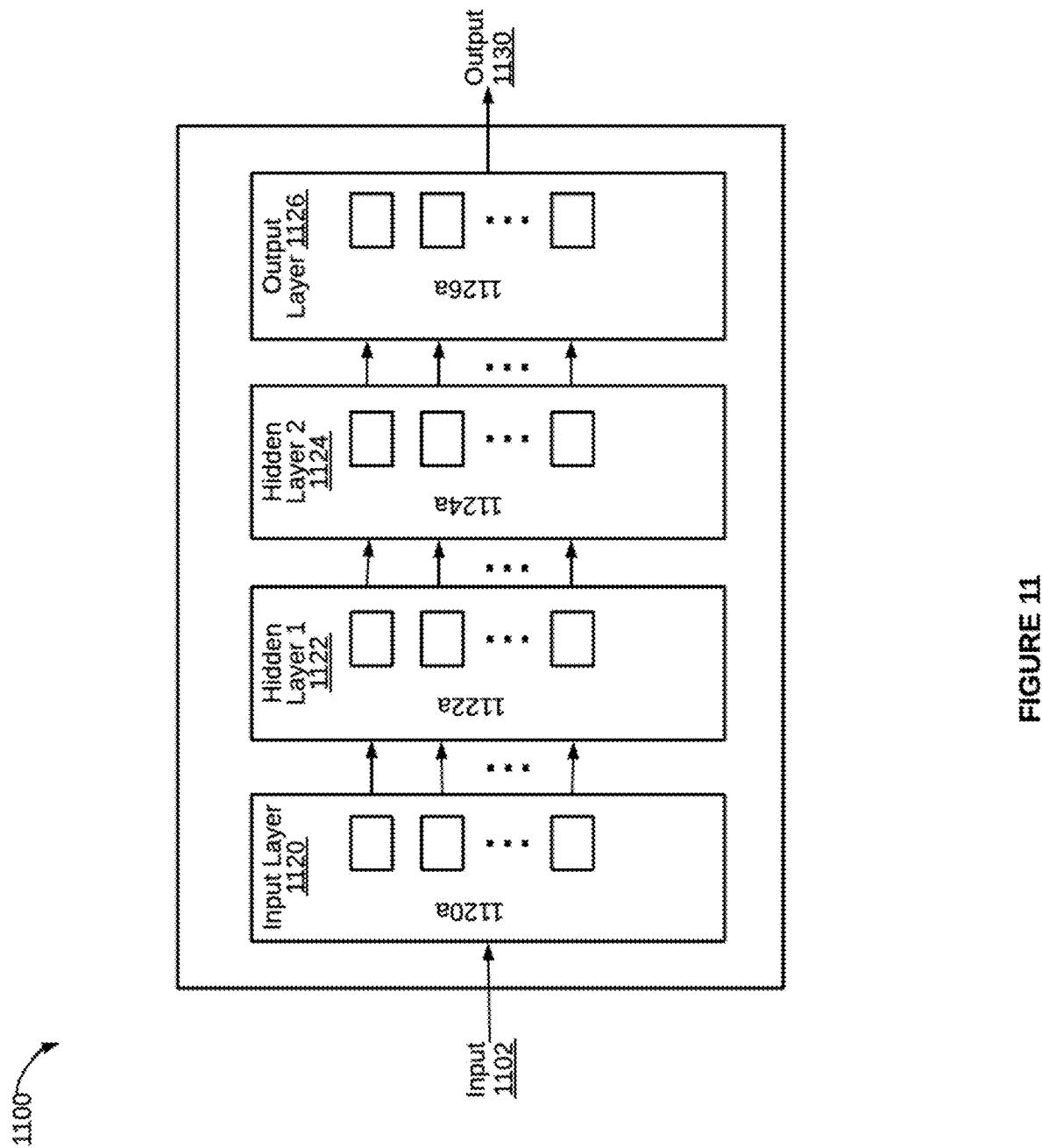
FIG. 11 is a block diagram of an example neural network in accordance with some implementations.

FIG. 11 is a block diagram of an example neural network 1100 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the neural network 1100 includes an input layer 1120, a first hidden layer 1122, a second hidden layer 1124, and an output layer 1126. While the neural network 1120 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

In various implementations, the input layer 1120 is coupled (e.g., configured) to receive various inputs (e.g., image data). For example, the input layer 1120 receives pixel data from one or more image sensors. In various implementations, the input layer 1120 includes a number of long short-term memory (LSTM) logic units 1120$a$, which are also referred to as model(s) of neurons by those of ordinary skill in the art. In some such implementations, an input matrix from the features to the LSTM logic units 1120$a$ include rectangular matrices. For example, the size of this matrix is a function of the number of features included in the feature stream.

In some implementations, the first hidden layer 1122 includes a number of LSTM logic units 1122$a$. In some implementations, the number of LSTM logic units 1122$a$ ranges between approximately 10-500. Those of ordinary skill in the art will appreciate that, in such implementations, the number of LSTM logic units per layer is orders of magnitude smaller than previously known approaches, which allows such implementations to be embedded in highly resource-constrained devices. As illustrated in the example of FIG. 11, the first hidden layer 1122 receives its inputs from the input layer 1120. For example, the first hidden layer 1122 performs one or more of following: a convolutional operation, a nonlinearity operation, a normalization operation, a pooling operation, and/or the like.

In some implementations, the second hidden layer 1124 includes a number of LSTM logic units 1124$a$. In some implementations, the number of LSTM logic units 1124$a$ is the same as or similar to the number of LSTM logic units 1120$a$ in the input layer 1120 or the number of LSTM logic units 1122$a$ in the first hidden layer 1122. As illustrated in the example of FIG. 11, the second hidden layer 1124 receives its inputs from the first hidden layer 1122. Additionally and/or alternatively, in some implementations, the second hidden layer 1124 receives its inputs from the input layer 1120. For example, the second hidden layer 1124 performs one or more of following: a convolutional operation, a nonlinearity operation, a normalization operation, a pooling operation, and/or the like.

In some implementations, the output layer 1126 includes a number of LSTM logic units 1126$a$. In some implementations, the number of LSTM logic units 1126$a$ is the same as or similar to the number of LSTM logic units 1120$a$ in the input layer 1120, the number of LSTM logic units 1122$a$ in the first hidden layer 1122, or the number of LSTM logic units 1124$a$ in the second hidden layer 1124. In some implementations, the output layer 1126 is a task-dependent layer that performs a computer vision related task such as feature extraction, object recognition, object detection, pose estimation, or the like. In some implementations, the output layer 1126 includes an implementation of a multinomial logistic function (e.g., a soft-max function) that produces a number of outputs.

Neural networks, such as convolutional neural networks (CNNs), are often used to solve computer vision problems including feature extraction, object recognition, object detection, and pose estimation. A modern CNN is typically described as having an input layer, a number of hidden layers, and an output layer. In at least some scenarios, the input to the input layer of the CNN is an image frame while the output layer is a task-dependent layer. The hidden layers often include one of a plurality of operations such as convolutional, nonlinearity, normalization, and pooling operations. For example, a respective convolutional layer may include a set of filters whose weights are learned directly from data. Continuing with this example, the output of these filters are one or more feature maps that are obtained by applying filters to the input data of the convolutional layer.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first image could be termed a second image, and, similarly, a second image could be termed a first image, which changing the meaning of the description, so long as the occurrences of the "first image" are renamed consistently and the occurrences of the "second image" are renamed consistently. The first image and the second image are both images, but they are not the same image.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
in a type-agnostic object segmentation system including one or more processors and non-transitory memory:
obtaining a data set, wherein the data set includes a plurality of image data frames, wherein each of the plurality of image data frames is associated with a respective segmentation mask, the respective segmentation mask demarking at least one object instance representation within a corresponding one of the plurality of image data frames;
generating a respective embedding vector for each of a plurality of pixels of the plurality of image data frames, wherein the plurality of pixels of the plurality of image data frames includes at least a portion of an image data frame;
mapping a plurality of embedding vector representations into a dataspace, wherein the dataspace is defined by a dimensionality of the plurality of embedding vector representations;
disambiguating the plurality of embedding vector representations within the dataspace in order to detect at least one object instance representation candidate in the image data frame;
comparing the at least one object instance representation candidate against the respective segmentation mask; and
adjusting the type-agnostic object segmentation system in order to satisfy an error threshold across the plurality of image data frames according to a determination that the at least one object instance representation candidate and the respective segmentation mask differ by a threshold value.

2. The method of claim 1 further comprising:
generating a label for each of the plurality of pixels in the image data frame.

3. The method of claim 1 further comprising:
generating one or more features from each of the plurality of the pixels in the image data frame.

4. The method of claim 1 further comprising:
identifying one or more features associated with one or more pixels from the each of the plurality of pixels.

5. The method of claim 1, wherein the object instance representation candidate satisfies a recognition threshold value.

6. The method of claim 1, wherein disambiguating the plurality of embedding vector representations further includes satisfying a disambiguation threshold value, and wherein the disambiguation threshold value corresponds to a distance between the plurality of embedding vector representations within the dataspace.

7. The method of claim 1, wherein adjusting the type-agnostic object segmentation system includes adjusting filter weights in order to satisfy an error threshold across the plurality of image data frames.

8. The method of claim 1, wherein adjusting the type-agnostic segmentation system if the threshold value is not satisfied further comprises:
generating a second respective embedding vector for each of a second set of a plurality of pixels of a subsequent image data frame;
mapping a second plurality of embedding vector representations into the dataspace;
disambiguating the second plurality of embedding vector representations within the dataspace in order to detect a second object instance representation candidate in the second image data frame; and
comparing the second object instance representation candidate against the respective segmentation mask.

9. The method of claim 1, wherein adjusting the type-agnostic segmentation system if the error threshold is not satisfied further comprises:
generating a third respective embedding vector for each of a third set of a plurality of pixels of a subsequent image data frame;
mapping a third plurality embedding vector representations into the dataspace;
disambiguating the third plurality of embedding vector representations within the dataspace in order to detect a third object instance representation candidate in the third image data frame; and
comparing the third object instance representation candidate against the respective segmentation mask.

10. A type-agnostic object segmentation system comprising:
one or more processors;
a non-transitory memory; and
one or more programs stored in the non-transitory memory, which, when executed by the one or more processors, cause the type-agnostic object segmentation system to:
obtain a data set, wherein the data set includes a plurality of image data frames, wherein each of the plurality of image data frames is associated with a respective segmentation mask, the respective segmentation mask demarking at least one object instance representation within a corresponding one of the plurality of image data frames;
generate a respective embedding vector for each of a plurality of pixels of the plurality of image data frames, wherein the plurality of pixels of the plurality of image data frames includes at least a portion of an image data frame;
map a plurality of embedding vector representations into a dataspace, wherein the dataspace is defined by a dimensionality of the plurality of embedding vector representations;
disambiguate the plurality of embedding vector representations within the dataspace in order to detect at least one object instance representation candidate in the image data frame;
compare the at least one object instance representation candidate against the respective segmentation mask; and
adjust the type-agnostic object segmentation system in order to satisfy an error threshold across the plurality of image data frames according to a determination that the at least one object instance representation candidate and the respective segmentation mask differ by a threshold value.

11. The type-agnostic object segmentation system of claim 10, wherein the object instance representation candidate satisfies a recognition threshold value.

12. The type-agnostic object segmentation system of claim 10, wherein disambiguating the plurality of embedding vector representations further includes satisfying a disambiguation threshold value, and wherein the disambiguation threshold value corresponds to a distance between the plurality of embedding vector representations within the dataspace.

13. The type-agnostic object segmentation system of claim 10, wherein adjusting the type-agnostic object segmentation system includes adjusting filter weights in order to satisfy an error threshold across the plurality of image data frames.

14. The type-agnostic object segmentation system of claim 10, wherein the one or more programs further cause the type-agnostic object segmentation system to:
generate a label for each of the plurality of pixels in the image data frame.

15. The type-agnostic object segmentation system of claim 10, wherein the one or more programs further cause the type-agnostic object segmentation system to:
generate one or more features from each of the plurality of the pixels in the image data frame.

16. A non-transitory memory storing one or more programs, which, when executed by one or more processors of a type-agnostic object segmentation system, cause the type-agnostic object segmentation system to:
obtain a data set, wherein the data set includes a plurality of image data frames, wherein each of the plurality of image data frames is associated with a respective segmentation mask, the respective segmentation mask demarking at least one object instance representation within a corresponding one of the plurality of image data frames;
generate a respective embedding vector for each of a plurality of pixels of the plurality of image data frames, wherein the plurality of pixels of the plurality of image data frames includes at least a portion of an image data frame;
map a plurality of embedding vector representations into a dataspace, wherein the dataspace is defined by a dimensionality of the plurality of embedding vector representations;
disambiguate the plurality of embedding vector representations within the dataspace in order to detect at least one object instance representation candidate in the image data frame;
compare the at least one object instance representation candidate against the respective segmentation mask; and
adjust the type-agnostic object segmentation system in order to satisfy an error threshold across the plurality of image data frames according to a determination that the at least one object instance representation candidate and the respective segmentation mask differ by a threshold value.

17. The non-transitory memory of claim 16, wherein the object instance representation candidate satisfies a recognition threshold value.

18. The non-transitory memory of claim 16, wherein disambiguating the plurality of embedding vector representations further includes satisfying a disambiguation threshold value, and wherein the disambiguation threshold value corresponds to a distance between the plurality of embedding vector representations within the dataspace.

19. The non-transitory memory of claim 16, wherein adjusting the type-agnostic object segmentation system includes adjusting filter weights in order to satisfy an error threshold across the plurality of image data frames.

20. The non-transitory memory of claim 16, wherein the one or more programs further cause the type-agnostic object segmentation system to:
generate a label for each of the plurality of pixels in the image data frame.

21. The non-transitory memory of claim 16, wherein the one or more programs further cause the type-agnostic object segmentation system to:
generate one or more features from each of the plurality of the pixels in the image data frame.

* * * * *